United States Patent
Pike et al.

(10) Patent No.: US 12,045,345 B2
(45) Date of Patent: Jul. 23, 2024

(54) METHOD TO PREVENT ROOT LEVEL ACCESS ATTACK AND MEASURABLE SLA SECURITY AND COMPLIANCE PLATFORM

(71) Applicant: Cyemptive Technologies, Inc., Snohomish, WA (US)

(72) Inventors: Robert Pike, Woodinville, WA (US); Gary Zelanko, Snohomish, WA (US); Bryan Greene, Kenly, NC (US)

(73) Assignee: Cyemptive Technologies, Inc., Snohomish, WA (US)

( * ) Notice: Subject to any disclaimer, the term of this patent is extended or adjusted under 35 U.S.C. 154(b) by 0 days.

(21) Appl. No.: 18/308,388

(22) Filed: Apr. 27, 2023

(65) Prior Publication Data

US 2023/0267201 A1    Aug. 24, 2023

Related U.S. Application Data

(63) Continuation of application No. 16/907,302, filed on Jun. 21, 2020, now Pat. No. 11,669,616.
(Continued)

(51) Int. Cl.
*G06F 21/55*    (2013.01)
*G06F 21/54*    (2013.01)
(Continued)

(52) U.S. Cl.
CPC ............ *G06F 21/554* (2013.01); *G06F 21/54* (2013.01); *H04L 41/5019* (2013.01);
(Continued)

(58) Field of Classification Search
CPC .. G06F 21/554; G06F 21/54; G06F 2221/034; G06F 2221/2115;
(Continued)

(56) References Cited

U.S. PATENT DOCUMENTS

| 7,082,463 B1 | 7/2006 | Bradley et al. |
| 9,117,069 B2 | 8/2015 | Oliphant et al. |

(Continued)

FOREIGN PATENT DOCUMENTS

| CA | 2424144 A1 | 10/2003 |
| JP | 2010117783 A | 5/2010 |

(Continued)

OTHER PUBLICATIONS

Muller, N. "Managing Service Level Agreements," *International Journal of Network Management*, vol. 9, No. 3, May 1999, pp. 155-166.
(Continued)

*Primary Examiner* — Joseph P Hirl
*Assistant Examiner* — Thomas A Gyorfi
(74) *Attorney, Agent, or Firm* — Fenwick & West LLP

(57) ABSTRACT

A compliance monitor measures metrics regarding one or more managed devices in a network. The compliance monitor generates a log based on the information detected by the measurement trackers and to transmit a report based on the generated log to a recipient. The compliance monitor also initiates one or more security actions based on the one or more measurement trackers indicating that a measured metric exceeds an associated threshold measurement value.

20 Claims, 7 Drawing Sheets

Related U.S. Application Data

(60) Provisional application No. 62/865,080, filed on Jun. 21, 2019, provisional application No. 62/865,083, filed on Jun. 21, 2019.

(51) Int. Cl.
  *H04L 9/40* (2022.01)
  *H04L 41/5019* (2022.01)
  *H04L 43/065* (2022.01)
  *H04L 43/16* (2022.01)

(52) U.S. Cl.
  CPC ............ *H04L 43/065* (2013.01); *H04L 43/16* (2013.01); *H04L 63/1433* (2013.01); *H04L 63/1491* (2013.01); *G06F 2221/034* (2013.01)

(58) Field of Classification Search
  CPC ..... G06F 2221/2127; G06F 2221/2139; G06F 21/552; G06F 21/57; H04L 41/5019; H04L 43/065; H04L 43/16; H04L 63/1433; H04L 63/1491; H04L 63/1441; H04L 41/5009; H04L 63/1408
  See application file for complete search history.

(56) References Cited

U.S. PATENT DOCUMENTS

| | | | |
|---|---|---|---|
| 10,404,469 | B2 | 9/2019 | Madhavan et al. |
| 10,552,796 | B1 | 2/2020 | Delacourt et al. |
| 10,754,972 | B2 | 8/2020 | Efendiyev et al. |
| 11,093,518 | B1* | 8/2021 | Lu ...................... G06F 11/3476 |
| 11,100,232 | B1 | 8/2021 | Juncker et al. |
| 2004/0010557 | A1 | 1/2004 | Chapman et al. |
| 2005/0015624 | A1 | 1/2005 | Ginter et al. |
| 2005/0086531 | A1 | 4/2005 | Kenrich |
| 2005/0240756 | A1 | 10/2005 | Mayer |
| 2006/0112311 | A1 | 5/2006 | Cobb |
| 2007/0220068 | A1 | 9/2007 | Thompson et al. |
| 2008/0059474 | A1 | 3/2008 | Lim |
| 2012/0011573 | A1 | 1/2012 | Menasce et al. |
| 2013/0031037 | A1 | 1/2013 | Brandt et al. |
| 2013/0298244 | A1 | 11/2013 | Kumar et al. |
| 2014/0317754 | A1 | 10/2014 | Niemela et al. |
| 2015/0006897 | A1 | 1/2015 | Rajakarunanayake et al. |
| 2015/0121532 | A1 | 4/2015 | Barel |
| 2016/0330221 | A1 | 11/2016 | Dulkin et al. |
| 2017/0061432 | A1 | 3/2017 | Ekambaram et al. |
| 2017/0201545 | A1 | 7/2017 | Nicodemus et al. |
| 2017/0250892 | A1 | 8/2017 | Cooper et al. |
| 2018/0062786 | A1 | 3/2018 | Hodge |
| 2018/0316577 | A1* | 11/2018 | Freeman .............. H04L 41/5009 |
| 2018/0324056 | A1* | 11/2018 | Occhialini .......... H04L 41/5006 |
| 2019/0102717 | A1* | 4/2019 | Wu ....................... H04L 41/147 |
| 2019/0116189 | A1 | 4/2019 | Schlegel et al. |
| 2019/0324879 | A1 | 10/2019 | Abraham et al. |
| 2020/0285752 | A1 | 9/2020 | Wyatt et al. |
| 2020/0401692 | A1 | 12/2020 | Pike et al. |
| 2020/0410448 | A1 | 12/2020 | Gadge et al. |
| 2022/0391291 | A1 | 12/2022 | Helland |

FOREIGN PATENT DOCUMENTS

| | | |
|---|---|---|
| JP | 2016-184358 A | 10/2016 |
| JP | 2017-010258 A | 1/2017 |

OTHER PUBLICATIONS

Extended European Search Report and Written Opinion, European Patent Application No. 20827633.7, dated Sep. 25, 2023, 13 pages.
Buecker, A. et al. "IBM Security Solutions Architecture for Network, Server, and Endpoint," IBM Redbooks, Feb. 17, 2011.
Canadian Intellectual Property Office, Office Action, Canadian Patent Application No. 3,144,465, dated Jul. 28, 2022, 6 pages.
Jacobs, S. "Securing Management and Managing Security," Engineering Information Security: The Application of Systems Engineering Concepts to Achieve Information Assurance, 2016, pp. 607-659.
PCT International Search Report and Written Opinion, PCT Application No. PCT/US2020/038837, dated Oct. 26, 2020, 17 pages.
Rios, E. "Service Level Agreement-Based GDPR Compliance and Security Assurance in (multi) Cloud-Based Systems." IET Software, vol. 13, No. 3, Feb. 1, 2019, pp. 1-12.
The Japan Patent Office, Official Notice of Rejection, Japanese Patent Application No. 2021-576332, dated Jul. 12, 2022, 9 pages.
United States Office Action, U.S. Appl. No. 16/907,305, dated Sep. 21, 2021, 13 pages.
United States Office Action, U.S. Appl. No. 17/841,918, dated Dec. 22, 2022, 24 pages.
United States Office Action, U.S. Appl. No. 16/907,302, dated Jun. 27, 2022, 10 pages.
Canadian Intellectual Property Administration, Office Action, Canadian Patent Application No. 3,144,465, Dec. 27, 2023, 6 pages.
United States Office Action, U.S. Appl. No. 18/350,587, Feb. 29, 2024, 34 pages.
Japan Patent Office, Office Action with English Translation, Japanese Patent Application No. 2022-164051, May 21, 2024, 8 pages.

* cited by examiner

[comment]: # 
METHOD TO PREVENT ROOT LEVEL ACCESS ATTACK AND MEASURABLE SLA SECURITY AND COMPLIANCE PLATFORM

CROSS-REFERENCE TO RELATED APPLICATIONS

This application is a continuation application of U.S. patent application Ser. No. 16/907,302, filed Jun. 21, 2020, which claims priority to U.S. Prov. App. No. 62/865,083, filed Jun. 21, 2019, and U.S. Prov. App. No. 62/865,080, filed Jun. 21, 2019, each of which is incorporated by reference.

BACKGROUND

An administrative or root account has full control over a device, operating system (OS) or applications executing on a system. When an administrator logs into a machine the administrator's user account is placed with a "admin or administrator" group account with privileges to perform such operations and duties for being an administrator. When a malicious attacker breaks into an operating system or application, they may attempt to gain this administrative privilege using the administrative account, in order to be able to clean up tracks and perform all necessary changes needed to perform whatever actions against the device or network they would like.

Furthermore, contemporary computer networks are constantly compromised. Multiple attack vectors exist, and multiple mitigation methods have been implemented to avoid or recover from these attacks. However, the entity which owns a system of computers often times lack insight into attack against their computers. For example, in many cases, administrative personnel can only provide an estimate of the timeframe of an attack after it has occurred, as has been seen in notices by companies to their customers of prior successful acts by malicious actors to access sensitive or confidential data. Therefore, what is lacking is a method of controlling root access to a device to detect and recover from attacks as well as a method of measuring the timeframe during which various attacks occur and the timeframe to recover from these attacks.

Therefore, what is lacking is a system to be able to prevent root attacks and to measure compliance within a system of devices.

Figure 1:
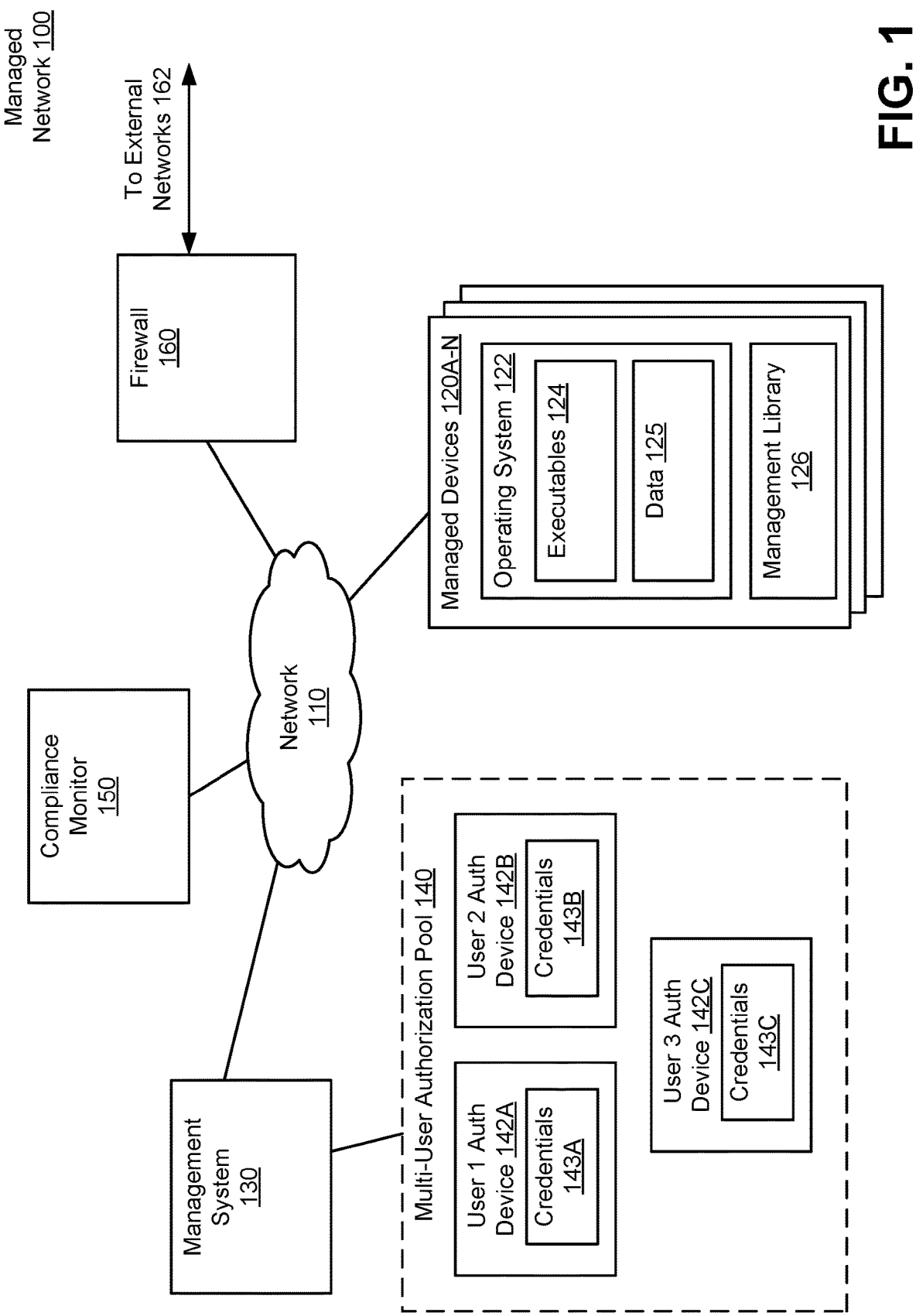
FIG. 1 illustrates a managed network for monitoring root-level attacks and measuring compliance on managed devices, in accordance with an embodiment.

The figures depict, and the detail description describes, various non-limiting embodiments for purposes of illustration only.

SUMMARY

Disclosed herein is a management system that detects an changes at the target device. The management system transmits a request message to authorization devices of the authorization users of the multi-user authorization pool to from the authorization users an indication of whether the detected change is approved. The management system receives a plurality of response messages from authorization devices of the multi-user authorization pool indicating whether the detected change is approved by the corresponding authorization user, and based on at least three of the plurality of response messages indicating a disapproval, that the detected change is disapproved. In response to the determination that the change is disapproved, an instruction message is sent to a target managed device to instruct the target managed device to rollback to an earlier state.

Further disclosed herein is a compliance monitor that measures metrics regarding one or more managed devices in a network. The compliance monitor generates a log based on the information detected by the measurement trackers and to transmit a report based on the generated log to a recipient. The compliance monitor also initiates one or more security actions based on the one or more measurement trackers indicating that a measured metric exceeds an associated threshold measurement value.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

A system can be implemented that prevents a root or administrative user or group to make undesired or unauthorized changes on an operating system (OS). Instead, the overall management now needs to meet critical scenarios of having multiple users in a real-time policy driven system to handle any and all changes that are executed at the OS or remote level. No unauthorized changes will be granted without multiple users signing off on those changes.

When a hacker takes ownership of a computer he escalates and figures out the administrator password. When he logs in with the administrator password today, he can then go in and open up any firewall rule changes. The rule changes in the OS are captured and applied because the administrator has full control over the machine to make those changes. When hitting apply, the OS kernel has no choice and accepts those changes within the local OS. However, a monitoring service within the machine as well as external to the machine will trigger a change state and immediately roll back the changes as it is not matching a known good state of the machine. Those rollback changes will be forced and an alert is transmitted to a security system where now a security operations center may be alerted to the changes. Once alerted, the security system may transmit alerts and/or messages to multiple users on a multiple custody approval list, who can then either accept the changes. Alternatively, if the changes are not accepted, the system may log the change as an intrusion and trigger a warning, alert, or sensor.

A challenge also arises in the case of system upgrades and patches. Typically, a root user is permitted at any time to accept patch changes, as the root user has the privileges to perform any action on the system. However, this will enable hackers to make changes to a core OS without getting noticed within the millions of changes that can take place during a patch upgrade. This makes it impossible to do file based change management to any platform to detect the changes in real-time. However, in one embodiment, to prevent this from occurring, a security system is implemented to only allow these changes in a different process and strictly disallow any changes to take place to an OS that is in a production state. All changes must be controlled and approved through the users in the multiple custody approval list, such that not even the administrator alone can apply changes to the production systems. This allows for the security system to detect any changes and reduce the false negative and false positive errors.

In the event where the malicious attacker attempts to disable any local monitoring services of the computer, the security system is capable of detecting the change (e.g., the local monitoring service may fail to send a heartbeat signal to the security system, or may be unresponsive to pings). Upon detecting the change, the security system may initiate a rebuild of the computer, by wiping and reinstalling the software layer on the computer (e.g., via a rebuild routine stored on firmware or other location inaccessible to the hacker). This rolls the system back to the original state.

Rollbacks are controlled centrally to what is the known good state. By having multiple copies (3+) of the known good state signature, when one copy falls out of state, then others force it back into state. A root user can change the state but it can only change its local copy. If any change performed centrally via approval by the users on the multiple custody approval list, this changes the multiple copies of the good state signature. Therefore, only by changing all copies will the system accept the change. Furthermore, the other copies are not stored within the computer for which the malicious attacker has access. This prevents the attacker from being able to access those copies of the signature.

The multiple user custody approval system requires multiple users to sign off within dashboard user interfaces presented to these users via the security system. The approval system may also include special groups. For example, in a security operations center there may be 12 operations people working and ⅔ of these may be needed to approve any changes. However, the operations lead and/or the customer may additionally be required to provide a final approval.

When all users on the multiple custody approval list (e.g., 3 users) approve the changes, the computer is in an Authorized Release State (ARS). In addition, the computer may be placed in an Authorized Provisioning State (APS). This state allows for multiple changes to take place while not requiring the users on the multiple custody approval list to approve each change. Instead, all changes are made, and then the computer is switched to the ARS state so that all the changes can be signed off at once. The APS state tracks all the changes still but doesn't force a lock down on the machine or rollback changes in real-time.

In addition, the computer may be placed in an Authorized Maintenance State (AMS). This is where builds are done and testing is performed. This state is used as for non-tracking state purposes and generally used for servers waiting to receive a configuration to be deployed to them. These computers are typically in an inventory available pool before an application is applied. Patches are applied in this state and fresh OS are built in this state.

To prevent any attacks to the approving users on the multiple custody approval list, the security system uses IP (Internet Protocol) signing scenarios where the approval must be done within certain IP restrictions as well as password and keys to be used. Therefore, if a user tried to approve from an IP on the Internet which is not on the allowed list of IPs the security system would trigger a sensor that the user approval is form an invalid network source. Even if a VPN (virtual private network) was available it can be locked to not grant the approval.

Furthermore, a new set of measurements and technologies can be used to counter the problem faced in today's environments. These new measurements do not exist today and any combination of these units together will enable new levels of "Security Service Level Agreements" that can actually be measured and reported on. This also enables new levels of security reporting for any type of compliance scenario measurable reports. It enhances all new levels of security and can expose how well or weak a current technology has been deployed within an existing environment.

In some embodiments, these include the following measurements:

MTTD=Mean Time To Detection: A core technology to measure the time a hacker has been attached to a network to the time the detection system can detect the hacker. This may comprise a counter that is measured in seconds. MTTD is one of the most challenging scenarios the world has faced today. The measurement calculates the time a connection has been established or application has been applied to a machine where the damages to OS (operating system)/Application/Database or service has been in a state. The technology can dynamically change its state based on MTTD time leveraging its other key patents. SLAs can be built from this new measurement technology. Counters designed in this state can be analyzed further with machine learning and also trigger other software elements like logging, alerts, scripts, reports, and correlated machine learning of various source IPs, macs, WWNs, protocols and more.

MTTI=Mean Time To Isolation: A core technology to measure the time after a hacker has been detected to the time it takes to isolate the hacker from performing further damage against the environment resources. This may comprise a counter that is measured in seconds. This measurement calculates the time of detection to time of isolation where all connected states and resources are filtered down to prevent hackers from getting access to resources during their compromised state. The calculated time from known problem to isolation should be near real-time but in today's technology, the reaction time is all manual and human driven. This technology will enable automated responses to real-time hacking from millions of sources at the same time. Making the defense against automated or machine driven attacks useless against the real-time counters and responses based on the results of the counters. The counters are dynamic per application or OS type. It is purpose built learning in real-time to respond to groundhog day. The time to isolate is a key counter in measuring response time of a hacked event. The actions performed by this new measurement tool also responds in real-time to hackers' actions making the attack managed faster than any comparable technology in the market today. SLAs can be built from this new measurement enabling stronger defenses against hackers.

HITT=Hacker Investigation Tracking Time: A tracker to determine a length of time for a hacker to remain at the system, due to honeypots and other lures, while recording the actions of the hacker and tracing his source. This may comprise a counter that is measured in seconds. This measurement calculates the time a hacker has been isolated to the time either a hacker is kicked out or has simply left. This new level of measurement also contributes to tricking the hacker to stay engaged with more bogus data by dynamically presenting fake data to capture the audience of the hacker to stay engaged while other resources are used to record and trace the hacker's tracks. The new measurement tool also enables new levels of SLAs based on time in sub seconds scenarios. For example, a counter measurement is 30.6 seconds but could be measured in milliseconds.

MTTR=Mean Time To Repair: After a hacker has either left or has been kicked out, the measured time to repair the OS/Application/Database. This may comprise a counter that is measured in seconds.

MTTS=Mean Time to Service: The recovery time of a service needs to be measured in case of a service disruption of an OS/App compromise. This measurement calculates the time a service is offline as well as a component (VM, containerized system, physical machine or other) is not available to respond to session requests. The MTTS primarily monitors and manages the service availability and uptime metrics. It contributes to the overall machine learning elements with its data outputs.

These measurement trackers, or counters, can measure the detection times described above can be enabled via a secure service to any OS on any application integration. Counters are tunable based on combination of sensors but not limited to the following: 1) OS/application build completion; 2) when the system it is put into service and accepting traffic for users or requests; 3) application specific or service specific sensors (e.g., the counter is triggered to start upon some specific application process); 4) to user login; 5) to file system access, port access, log entry, integrity checker, simple uptime clock; 6) or others. User activity/system automation activity may also part of the measurable counters. Sensors can be integrated with each other or existing 3rd party sensors or counters.

In one embodiment, the counters are started from the time an OS has been provisioned or restored to a known good state. Once it is placed into an available pool for service the connectivity to the OS has been currently placed in the "Available" pool for service. In another embodiment, the counters are dynamically initialized and assigned based on tunable algorithms to measure any combination of the above times. These initializations may be local to a system, centralized, or distributed across multiple systems, and may be implemented using a security key.

In another embodiment, the counters may be initialized based on the triggered honeypot and fake resources placed on the system as a track. For example, fake folders within the OS which would normally no be accessed during normal operations may be accessed by a bot or human during a malicious attack. Additional honeypots may be in the form of user accounts. For example, a system may have 10+ user accounts where 6 of them will be honeypots that are sensors that trigger counters. If any of these fake user accounts are accessed, then the system will determine that a hacker has accessed the system. Root access may also be classified as one of the sensors. Admins are part of the root group but the root as well as other admin accounts may all be sensors that trigger a roll, SLA monitor, state of the machine issue and counter to start.

In another embodiment, once in the in service pool, the counters may be started. Each connection to the OS/APP are profiled and measured. Sensors built into the counter can be triggered.

In another embodiment, any modifications of the system may trigger one or more of the counters to initiate. In some cases, the system may not allow patching inline while the OS is in service. This allows too many changes to the file system and components of the OS to cause too many false negatives and false positives to be detected (which may trigger the counter). Instead, patches may occur offline, to reduce the number of detected false negatives and false positives. This allows accuracy to reach 99%+.

The system may be monitored externally to determine whether to trigger the counters, by having an external system monitor the local system via allowed access through a firewall or other load balancers. The control time or access time may also be monitored remotely.

In one embodiment, the counters may be stopped, i.e., detect the termination or end of the event, when the OS is powered off or based on dynamic ACLs (access control lists) indicating resource access based on sensors triggered. For example, connections to a database are dynamically removed if root login is detected in the local webserver and is trying to make changes to the OS.

In the case of the use of honeypot resources, an access to these files or resources may trigger an action response, such as an isolation of the system, and would set the system into a hacked state. This would ultimately cause the OS to be completely rebuilt and the hacker caught in the dynamically generated honeypot OS. The counter may be terminated after the rebuilding, as the hacking incident is over after the rebuild. The rebuilding of the OS may include the wiping of the existing software layer on the system and the re-imaging, rebuilding, and/or reinstallation of the software layer to an original state. The uptime of the OS in the rolling system is tuned to the application. An example lifetime of an OS is usually capped around 30 min max but can be as short as 10 seconds. If the lifetime of the OS standard configuration is 10 seconds and the measured SLA on the service is 30 seconds then the actual rolling time will be 20 seconds. The OS is rebuilt based on the SLA, thus forcing all threats that are in the OS to become irrelevant as they need to be executed within that SLA period. All traffic from malicious activity may be analyzed via a machine learning algorithm to detect specific patterns to further determine information related to the attack.

The system may support contextual machine learning to stop counters as well as allow control over the devices as dynamic calls to the host or firmware (e.g., BIOS) of the system to reboot the server, or if the system is a virtual machine (VM) would reboot the VM, or if the system is a container in a containerized environment, to rebuild the container. In either of these cases access to the system by the hacker is terminated and thus the hacker cannot perform any further attacks within that SLA time. As the rebuild of the servers allows for a shortened time period for access, a hacker cannot cause additional damage to the system.

One example application of such counters is for a system that handles credit card transactions. In such an application, the SLA thresholds indicating a desired maximum time for any of the mean times indicated above may be based on the calculated transaction time of each transaction. A machine learning or other algorithm may be applied to determine the min and max transaction times of the credit card transactions, and the SLA may be built dynamically around these measurements to set the maximum and/or minimum times for TTD, TTI, TTC, TTH.

Nodes in a split session state may carry their counters forward. Having multiple nodes of the same memory/session state will carry the all SLA counters across physical devices. This will also help measure all forms of connection/session/replication activities.

The custom SLA counters can be monitored, picked up by any monitoring technology today which understands its designed output.

The SLA counters can be combined with other counters to improve on security posture and enable the advanced machine learning capabilities within and external machine learning processing as well.

The tools of MTTD, MTTI, MTTH, MTTS may generate logs, which can be consolidated. The log data performs the tracking of each tool's timeframe and measurements. The log data can be centralized like performance counters, which can then be analyzed in any database type for further analysis.

Measurable SLAs may be associated with reporting elements. The measurement counters will provide application aware points for customizing a min to max range based on an applications needs. The counter also can be used for generating events at all levels of the time interval.

Having these integrated counters can radically improve a security stance on compliance as these new counters can change the whole security compliance scenarios with now security measurable SLAs with measurable security compliance.

Security compliance is more of a process today which most companies are either in compliance or out of compliance based on a set of standards. The counters used above open up new levels of compliance as to now can be measured in real-time and not an external human driven process for verifying if a system or platform is in compliance. It opens up new levels of measurement at the compliance level counters where the detection time must be under a first time threshold and isolation time be under a second time threshold and hacking time (i.e., MTTH) be under a third predetermined time threshold. If these new counters are met and measured, then the system would be in compliance as measured. This is in contrast with traditional policies which are driven by human level questions, which do not perform any form of real-time measurement like the counters included above.

Furthermore, in traditional systems, the issue that was not considered was that these systems allowed a long period of time for the computing system and its OS to live in service. Due to this, these systems have to count all the time a potential attacker has been in the system. In contrast, by rebuilding the system as described above, this rolling system architecture reduces the mean times time down to seconds and minutes, which may be used to compute the SLA.

Additional details regarding these systems are described below with reference to FIGS. 1-7.

Exemplary System

Figure (FIG. 1 illustrates a managed network 100 for monitoring root-level attacks and measuring compliance on managed devices, in accordance with an embodiment. As illustrated, FIG. 1 shows a network 110, managed devices 120A-N (generally referred to as managed device(s) 120), a management system 130, a multi-user authorization pool 140, a compliance monitor 150, and a firewall 160. Although a certain arrangement and number of elements is shown here, in other embodiments the arrangement and layout of items differ. For example, the compliance monitor 150 and/or the firewall 160 may be components of the management system 140. In one embodiment, one or more of the elements described here are implemented in a firmware, FPGA (field programmable gate array), integrated circuit, chip, SoC, or other hardware device.

The network 110, which can be wired, wireless, or a combination thereof, enables communications among at least the elements shown, and may include the Internet, a LAN, VLAN (e.g., with VPN), WAN, or other network. In one embodiment, the networks 110 uses standard communications technologies and/or protocols, such as Secure Hypertext Transfer Protocol (HTTPS), Transmission Control Protocol/Internet Protocol (TCP/IP), Uniform Resource Locators (URLs), and the Doman Name System (DNS). In another embodiment, the entities can use custom and/or dedicated data communications technologies instead of, or in addition to, the ones described above. In one embodiment, all communications on the network 110 is monitored by the management system 130. Therefore, any communication, whether secured, tunneled, plaintext, or otherwise, between the elements on the network 110 and other external networks may be gated by a firewall, such as firewall 160. Using this method, the management system 130 may be able to monitor the activity on the network for any changes.

The managed devices 120A-N are computing devices which communicate with each other and in some cases with devices on external networks via the network 110. These devices may include any type of device capable of executing computer-readable instructions, and may have an architecture that includes components described below with reference to FIG. 7. For example, these may include smartphones, IoT (Internet of Things) devices, wireless devices, smart speakers, wearable devices, tablets, virtual/artificial/mixed reality devices, desktop computers, laptops, server computers, wireless access points, routers, dumb terminals, and so on. The managed devices 120 may connect directly to the network 110 without passing through any intervening networks, or connect to the network 110 via an external network. This may be achieved using a secure communications method, such as a network tunnel (e.g., a VPN). In one embodiment, when the managed device connects via an external network to the network 110, all its communications with any network is monitored by the management system 130.

In one embodiment, each managed device 120 may include an operating system (OS) 122 that may be used to execute executables 124. Each managed device 120 may also include a management library 126 used to communicate with the management system 130 in order to monitor activity performed using the operating system 122 and executables 124 and to revert any changes that are detected during the use of the operating system 122.

The operating system 122 for the managed device 120 is a set of computer-readable instructions that provides the basic system software used to manage computer hardware, hardware resources, software resources, and to provide a common interface and set of services for the executables 124 that are executed by the manage device 120. Examples of operating systems include WINDOWS®, LINUX®-based operating systems, FreeBSD, OS X®, and so on. The executables 124 are also sets of computer readable instructions that can be executed by the managed device 120 via the operating system 122, but which also communicate with the services and interfaces provided by the operating system 122 in order to function. The operating system 122 may also include data 125, which represents non-executable computer-readable information that may be used to configure settings the operating system 122 and/or executables 124 and store user or other data (e.g., database files, media files, text files, etc.). Although the data 125 is shown to be part of the operating system 122, some data 125 may be OS-agnostic and can be utilized even if a different operating system 122 were used for the managed device 120. The computer readable instructions and information for the operating system 122, executables 124, and data 125 may be stored on storage media residing at the managed device 120 or at a remote location that can be accessed by the managed device 120 via the network 110.

The operating system 122 has a kernel, which is a portion of the computer readable instructions of the operating system 122 that provide the core functionalities of the operating system 122. This typically includes providing an interface to hardware resources, providing virtual memory interfaces, switching context between multiple executables 124 that are running on the operating system 122, and providing various levels of security access to resources provided by the operating system 122, such as access to files, hardware resources (e.g., network access, trusted platform module access, external I/O (input/output) access, and so on). The kernel typically restricts access based on a user permission scheme, whereby a root or administrative user has full access to all resources that the operating system 122 is capable of providing, while other users have different sets of more restrictive access to these resources. The access given to each user is their set of permissions. Each user is provided with a user account on the system, which the user can access via some credential authentication system (e.g., username/password, rotating token, biometrics). This user account, once accessed, provides the user with the aforementioned permissions. Users with more restrictive permissions cannot perform many undesirable actions on the operating system 122, as they are restricted to access only a small subset of resources. However, an administrative, root, or system user account can perform many actions, some of which may be deemed unapproved. Access to the root account, if normally accessed by an authorized user, would not necessarily pose a security risk to the managed device 120. However, if this same root account is accessed by a malicious user, either via a vulnerability in the code of the operating system 122 or by compromising the credential authentication of the authorized user of the root account, this poses a significant threat to the managed device 120, as now the malicious user has unrestricted access to the managed device 120, and potentially to other devices on the managed network 110 if the compromised user account used by the malicious attacker can be used to access other devices on the network. Similarly, using a system account, an unauthorized patch or upgrade to the operating system may occur which includes malicious code. The changes caused by these unrestricted user accounts may be unapproved and may result in negative consequences, such as stealing confidential information (e.g., data 125 that is confidential) from storage within the managed network 100, creating a backdoor access within the network 110, causing devices on the network 110 to cease functioning, and so on.

To mitigate these types of changes, each managed device 120 further includes a management library 126 to monitor the activities within the operating system 122 and, in the event that a change is detected, the management library 126 can remediate the change by, for example, rolling back the managed device 120 to a previously known good state. The management library 126 may perform this function by injecting one or more detection binaries executing as executables 124 within the operating system 122 which monitor the managed device 120 and operating system for any changes. If any changes fall outside an exception list of changes that are allowable/approved for the managed device 120, the one or more detection binaries may transmit an alert/message to the management library 126 or to the management system 130 indicating that a change was detected. If the change is determined to be unauthorized, the management library 126 may revert any changes caused by the unapproved change. The management library 126 may determine that the change is unauthorized from a message received from the management system 130. To revert the changes, the management library 126 may rollback the operating system 122, and any associated executables 124 and data 125, to an earlier state. This may be performed by replacing the current operating system 122, including related executables 124 and data, with a previous image of the operating system 122. The previous image of the system is an exact copy of an earlier state of the operating system 122, executables 124, and data 125 as was previously stored in the corresponding electronic storage, and which is in a known good state. This type of rollback prevents further malicious activity from occurring in the operating system 122 of the managed device 120. Alternatively, the management library 126 performs a rollback the moment the change that falls outside the exception list is detected, and applies the change back to the managed device if it is determined to be approved. Additional details regarding the management library 126 are provided with reference to FIGS. 2-6 below.

The management system 130 receives messages of changes in any of the managed devices 120 on the network 110 from their management libraries 126 and instructs the management libraries 126 on the managed devices 120 with a message that includes instructions on how to respond to the change. As noted above, any indication of detected changes from the management library 126 may be transmitted to the management system 130. These changes may be those that were not on an exception list. This message may be encrypted, possibly via a rotating key. In response, the management system 130 may determine, based on an exception list for that managed device 120, whether the reported change is listed as an exception in the exception list. If the change is listed in the exception list, the management system 130 may send a message to the management library 126 for that managed device 120 indicating to allow the change. The exception list may include rules regarding what types of accesses, to what degree/amount, and to what types of resources are acceptable. If, on the other hand, the reported change is not listed in the exception list, the management system 130 may send one or more messages to the multi-user authorization pool 140 to determine if that change is acceptable, i.e., to determine if the change is approved. In other embodiments, the management system 130 may instead transmit messages requesting approval from the multi-user authorization pool 140 for all received messages of possible changes from the managed devices 120, without checking an exception list.

The multi-user authorization pool 140 is a set of authorization users who can approve or disapprove any reported changes from the managed device 120. These authorization users may be administrators, system operators, customers, security experts, etc. Each authorization user of the multi-user authorization pool 140 may have an authorization device, such as the authorization devices 142A-C (generally authorization devices 142). Although three devices are shown here, in other embodiments the pool 140 can include a greater number of devices and associated users with approval authorization. These authorization devices 142 are computing devices (such as those described below with reference to FIG. 7), and which themselves may be managed devices 120. Each authorization device 142 can inform the user of the device with a description of the reported change via any one of a standard set of output devices (e.g., a display, audio output, wireless interface). The authorization device 142 can also receive input from the user to authenticate the user, e.g., via credentials 143A-C, and to receive input from the user indicating whether the reported change is approved or disapproved. This input may be received via any one of a standard set of input devices (e.g., a keyboard, mouse, touchscreen). Each authorization device 142 may alert the user via some notification method (e.g., an audio, haptic, visual, or other output) that a change has been detected for a particular managed device 120. The user may input their credentials 143 in order to authenticate themselves. These credentials may be similar to credentials used to authenticate users for a managed device 120. They may include encryption keys, a certificate, biometrics, etc. The credentials may include a multi-factor authentication process. These credentials 143 may be transmitted for verification to the management system 130 or verified locally, after which the authorization device 142 outputs the description of the change to the user of the authorization device 142. The authorization user, via the authorization device 142, is presented with a description of the change. This might include log file information, a description of the access type, user account used to perform the access, a resource accessed, a specific error detected (e.g., loss of communication), and so on.

Each user of an authorization device 142 may have a set amount of time within which to approve a reported change, after which the management system 130 assumes by default that the user does not approve the change. Furthermore, a threshold number of users of authorization devices 142 must approve a change, before the management system 130 determines that that change is approved and instructs the management library 126 to allow the change to continue. If the threshold number of approvals is not reached, or if a threshold number of disapproval messages is received, then the management system 130 instructs the management library 126 to disapprove the change. This remediation may include, for example, rolling back changes as described previously. Alternatively, if the change is preemptively rolled back by the management library 126, then the management library does not revert the change back. As an alternative, the management system 130 determines that the change is approved only if it receives approvals from a certain percentage of the users of the multi-user authorization pool 140, and determines that the change is disapproved if it receives disapproval messages from a certain percentage of the users. In addition to transmitting a message to the management library 126 to rollback the system, the management system 130 may trigger other actions, such as to send a message to the firewall 160 to block external network access to the managed device 120 in which the change was detected, to instruct management libraries 126 of other managed devices 120 to block communications with the managed device 120 in question, and so on.

This process has many advantages. As more than one user is needed to approve any change deemed to be unapproved, the compromise of an authorization device 142 of any individual user who has approval capabilities does not compromise the entire system. Furthermore, as the system times out and disapproves any change if it does not receive the requisite number of approvals, it can continue to function even without continued user approvals and authorizations and continue to remain safe from attackers. Finally, as the approval process ultimately resides with a human, this avoids an issue where an automated approval system can perform an incorrect behavioral analysis of the reported change. An automated system can be targeted with vulnerabilities in order to deceive the system into determining that a change that is actually malicious is acceptable. For example, a resource access may be crafted in such a way that a heuristics or machine learning system determines that the pattern of access is similar to a normal access pattern, when in fact the access pattern is deliberately engineered to deceive the system and is actually malicious. By having a set of multiple human users approve any changes, both the attack vector of deceiving an automated behavioral analysis system, and the attack vector of compromising an individual administrative approval user's device, are mitigated. Additional details regarding the management system 130 and the multiple user/custody approval process is described below with reference to FIGS. 2-3 and FIG. 5.

In one embodiment, the managed network 100 further includes a compliance monitor 150 to compute one or more trackers to determine a level of compliance of the managed network 100 with an SLA (service level agreement). Many compromises of organizational networks and devices are detected many months after the attack, which hinders the ability of forensics analysis, recovery of any stolen data (e.g., data 125), and capture of the malicious attacker. Therefore, the ability to quickly track whether any SLA requirements have been violated is advantageous. The SLA here describes an agreement between the managed network 100 and any customers as to various measurable levels of service that the entity which manages/owns the managed network 100 aims to deliver to any of its clients. A violation of this SLA may indicate an unapproved change, such as an attack, has occurred on the managed network 100. The compliance monitor 150 may track metrics associated with the SLA to determine if the SLA has been violated. The measurements that may be tracked include mean time of 1) detection of attack, 2) isolation of attack, 3) persistence of attacker in system, 4) repair to the system, 5) recovery time of a service, and 6) return to compliance with the SLA metrics. In response to any one of the measurements exceeding a threshold value, the compliance monitor 150 may transmit a message to the management system 130, which may in turn transmit a message to the multi-user authorization pool 140 as described above. If the management system 130 determines that the users of the multi-user authorization pool 140 disapprove of the reported violation of the threshold value, the management system 130 may initiate a remedial action upon the affected managed devices 120, such as by rolling them back.

Using this method of compliance monitoring, the managed network 110 is able to ensure that the measured metrics in the system are guaranteed to stay within the SLA thresholds. If a tracked metric is measured to exceed a threshold which would trigger or eventually trigger an SLA violation, the system can take remedial action, such as rolling back affected systems, in a prompt manner. This ensures that SLA violations do not occur (or occur only very temporarily). This provides a service to customers that is more stable and resistant against attackers, which is desirable over existing systems in which an attack or other change may take many months to detect. Additional details regarding the compliance monitor 150 are described below with reference to FIGS. 4 and 6.

In one embodiment, the managed network 100 also includes a firewall 160 which can manage network traffic directed to and exiting from the network 110 to external networks 162. In one embodiment, the firewall 160 receives requests from the management system 130 to block network access (both inbound and outbound) by a managed device 120 to external networks 162, in the case where the management system 130 determines that the managed device 120 is exhibiting a change that is unapproved. To block the network access, the firewall 160 may perform analysis on network packets and traffic, such as deep packet inspection, to determine the source and destination of network data to/from the external networks 162 (e.g., via network address, network port, other header information, payload information), and may drop any identified network traffic that are from the managed device 120 from which an unapproved change was detected, or directed to the same managed device 120. In another embodiment, the firewall 160 may log the identified network traffic. The firewall 160 may also allow or selectively allow any identified network traffic to the destination based on instructions from the management system 130, for example, in the event that the managed device 120 is a device configured to trace or attract malicious users, e.g., a honeypot.

In one embodiment, the firewall 160 itself is a managed device 120, and includes a management library 126 which monitors changes in the operating system, executables, and data of the firewall 160 device itself to determine if any user is causing changes on the firewall 160 that is unapproved. If so, the management library 126 on the firewall 160 may transmit a message to the management system 130, and in response, if the change is not approved, the management system 130 may cause the firewall 160 to rollback its operating system, executables, and data, similar to the process described above for the managed device 120. In this fashion, the firewall 160 itself is also protected from any unauthorized root-level or other user attacks.

Example Management System

Figure 2:
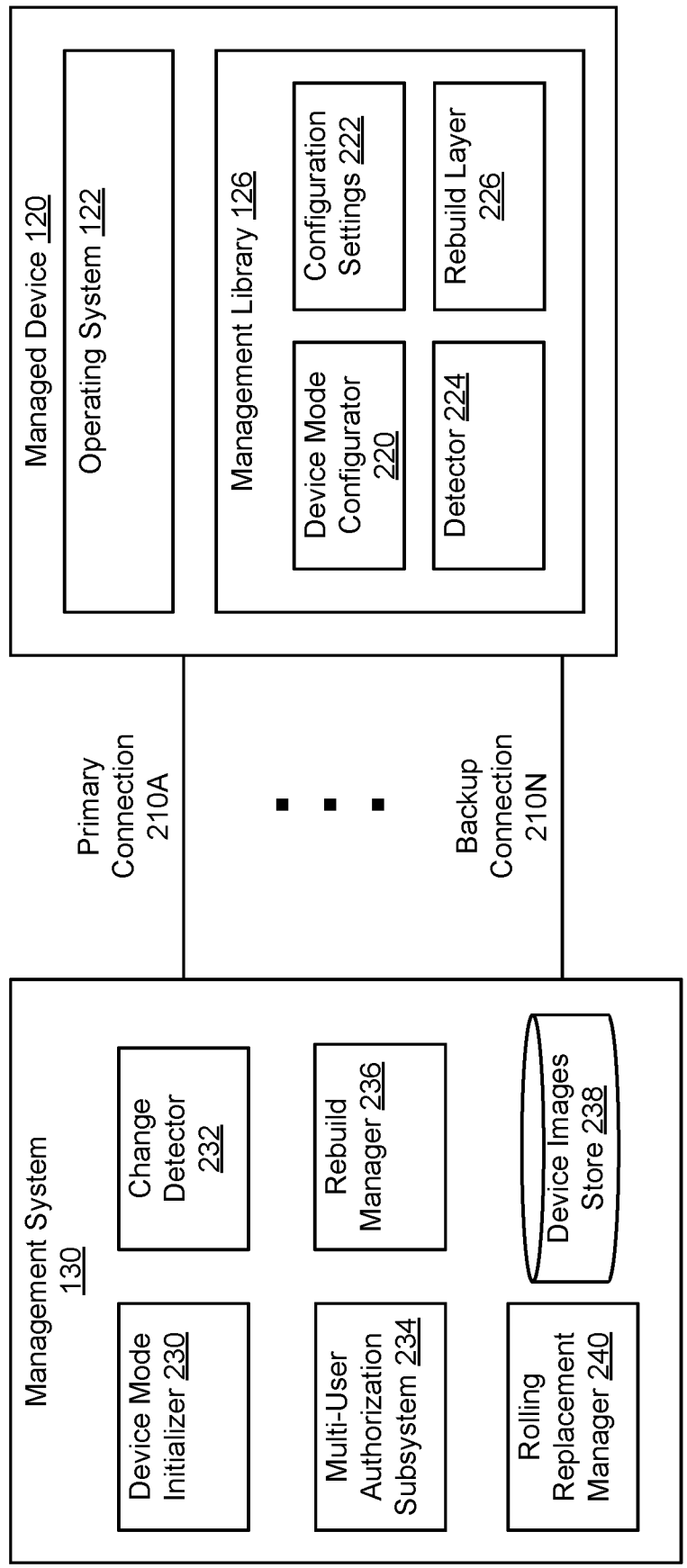
FIG. 2 is a block diagram that illustrates a detailed view of the management system and managed device with management library of FIG. 1, in accordance with an embodiment.

FIG. 2 is a block diagram that illustrates a detailed view 200 of the management system 130 and managed device with management library 126 of FIG. 1, in accordance with an embodiment. FIG. 2 illustrates the management system 130 with a device mode initializer 230, change detector 232, multi-user authorization subsystem 234, rebuild manager 236, device images store 238, and rolling replacement manager 240. The management system 130 communicates with the management library 126 of the managed device 120 via one or more connections 210A-N (generally referred to as connections 210). These include a primary and various backup connections in the event of failure or compromise of a path.

The device mode initializer 230 initializes the managed device 120 to one of a number of different states, based on the requirements of the managed device 120 and based on approval from users of the multi-user authorization pool 140. The device mode initializer 230 may receive a requisite approval from the multi-user authorization pool 140 to place the managed device 120 in one of the aforementioned states. This requisite approval may be approval by a threshold number of users, a threshold percentage of users, and/or approval by a special group of users within the pool. In response, the device mode initializer 230 configures the managed device 120 and management library 126 for the managed device 120 with configuration settings corresponding to that state.

In one embodiment, the managed device 120 can be in a release state, provisioning state, or maintenance state. These may be referred to as an Authorized Release State (ARS), Authorized Provisioning State (APS), and an Authorized Maintenance State (AMS), respectively.

In the release state, the device mode initializer 230 configures the managed device 120 to be in normal operating mode. This is a mode in which any changes detected at the managed device 120 trigger the management system 130 to request approval from a threshold number of users (e.g., at least 3 users) of the multi-user authorization pool 140, as described above.

In the provisioning state, the device mode initializer 230 configures the management system 130 to allow changes to be made to the managed device 120 without constantly requesting approval from the multi-user authorization pool 140 for each change, although the management system 130 may still track any changes that are made. This state may be used when initially configuring, i.e., provisioning, the managed device 120. When provisioning is completed, the device mode initializer 230 may be notified that the provisioning is completed (e.g., via an input from a user interface), and may request approval from a threshold number of users of the multi-user authorization pool 140 before converting the managed device 120 into the release state. Any changes logged during provisioning may be further reported to the users of the multi-user authorization pool 140 during this time for approval. Alternatively, the device mode initializer 230 may receive a message from a threshold number of users of the multi-user authorization pool 140 to convert the managed device 120 to the release state. This provisioning state may be used when a large number of changes need to be made to a managed device 120 during an initial phase.

The device mode initializer 230 may also receive a message to convert the managed device 120 into a maintenance state. In this state, no tracking is performed of the managed device 120 and no approvals are requested for any changes to the managed device 120. To initiate this state, the device mode initializer 230 configures the management library 126 of the managed device to stop tracking of any changes. Furthermore, the device mode initializer 230 configures the management system 130 to ignore the managed device 120. This state may be used for testing, configuration, patching, and other maintenance tasks (performed by trusted individuals). In addition, in this state, the managed device 120 may also be cut off from the rest of the devices in the managed network 100. Thus, this state may also be activated for a managed device 120 which is unresponsive or suspected to be compromised.

The change detector 232 detects any changes from the managed device 120, either via the management library 126 on the device or via direct means. The change detector 232 may receive messages from the management library 126 of the managed device 120 regarding any change that is detected. Specifically, the change may be detected by the detector 224 of the management library 126. In addition, the change detector 232 may detect changes with the managed device 120 directly. This may include detecting changes by analyzing the one or more connections 210 with the managed device 120, and by analyzing the messages received from the detector 224 of the managed device 120.

In one embodiment, the change detector 232 detects changes in the one or more connections 210 with the managed device. The management system 130 may in some cases maintain more than one connection, i.e., more than one logical or physical layer network paths, with the managed device 120. For example, the management system 130 may connect to the managed device 120 using a wireless and two different wired connections, or may maintain more than one route to the managed device 120 (e.g., via different entries in a routing table for the network 110). If the change detector 232 determines that any of these connections are disrupted, the change detector 232 may determine that a change has occurred. The change detector 232 may also receive one or more messages on these connections 210 from the managed device 120. These messages may be heartbeat messages. The heartbeat message may furthermore be encrypted via a rotating key. Each connection may receive a different type of heartbeat message encrypted with a different rotating key. If the change detector 232 does not receive one or more heartbeat messages on any one connection, or if the heartbeat message is encrypted improperly (e.g., using the wrong rotating key), the change detector 232 may determine that a change has occurred.

The change detector 232 may also analyze other messages sent and received by the managed device 120 to determine if a change has occurred. This may include the messages from the managed device 120 that indicate an change was detected by the management library 126 of the device. These messages may be signed using a rotating key, authenticated using some known method, or be in a standard format. If the change detector 232 determines that the signature, authentication method, and/or format of the messages does not match an expected result, the change detector 232 may determine that a change is detected.

The change detector 232 may also analyze other changes made by the managed device 120 using the network. These changes may include messages sent or received by the managed device 120 using the network. The change detector 232 may have access to one or more network infrastructure devices, such as switches, routers, hubs, access points, and other network switching equipment, such as the firewall 160, and can analyze the network traffic passing through these network infrastructure devices to extract messages that are sent and received by the managed device 120.

The change detector 232 may also actively query the managed device 120 by sending network requests to the managed device 120, e.g., via standard network protocols to determine if the response from the managed device 120 changes. If so, the change detector 232 detects that a change has occurred. For example, the change detector 232 may send an encrypted message to the managed device 120, for which the management library 126 can respond to with a predetermined message that is encrypted based on or includes a secret that is not known to an illegitimate attacker (e.g., a private key value). If the change detector 232 determines that the response from the managed device 120 is changed from a predetermined response (e.g., it does not include the secret), then the change detector 232 may determine that a change is detected.

In another embodiment, the change detector 232 also queries the managed device 120 by accessing the managed device 120 remotely using a remote access protocol (e.g., Telnet, remote desktop, SSH). The change detector 232 may use this remote access to execute various commands and interface with the operating system 122 of the managed device 120 to perform a set of checks. If the response to these checks is changed from a predetermined set of responses (e.g., a query results in the wrong or no response), the change detector 232 may also determine that a change is detected at the managed device 120.

If the change detector 232 determines that an change is detected, either by direct testing as described above or by receiving a message from the management library 126 of the managed device 120 indicating an change was detected, the change detector 232 may log the occurrence and send a message to the multi-user authorization subsystem 234 with a log of the change to determine if the change is approved. This message may include a description of the change exhibited by the managed device 120 as detected by the change detector 232 or received by the change detector 232 from the management library 126.

In one embodiment, the change detector 232 does not report those changes to the multi-user authorization system 234 which match any exceptions within an exception list. The exception list includes a list of all changes which are already approved and thus do not require additional approval by sending the message to the multi-user authorization subsystem 234. The changes may be defined using various rules that can be interpreted by the change detector 232 to determine the changes that excepted/excluded from requiring approval. These rules may indicate, for example, resource types, networks, files, protocols, file access, I/O access, application name, time range, user account, expected response, encryption type, and any other rules needed to define the pre-approved change. The exception list may be user defined or generated using machine learning means. In one embodiment, to generate the exception list, while the managed device 120 is in the provisioning state, changes made by the managed device 120 which are expected to occur during its normal operation are logged by the change detector 232. These are subsequently recorded in the exception list, upon approval from the multi-user authorization pool 140 via the multi-user authorization subsystem 234. These changes may include changes to a transaction log, temporary folder, external database, cache locations in memory, reads of web page files, etc. These are all changes which are expected to occur during the normal operation of the managed device 120.

The multi-user authorization subsystem 234 queries the multi-user authorization pool 140 to determine if any detected change is approved by the users of the multi-user authorization pool 140. To accomplish this, the multi-user authorization subsystem 234 may send messages to the authorization devices 142 of the authorization users of the multi-user authorization pool 140. The multi-user authorization subsystem 234 may include with each message a description of the change indicated in the no change and metadata, such as time of encounter, identification of the managed device 120 where the change was detected, user account in which the change was detected, and so on. The multi-user authorization subsystem 234 may receive responses from the one or more authorization devices 142 indicating whether the change is approved. The multi-user authorization subsystem 234 may ignore approval messages which are received from users in the multi-user authorization pool 140 which arrive from authorization devices 142 in which authentication failed for the authorization user (e.g., due to wrong credentials), or where the network addresses or other criteria for these authorization devices 142 do not match certain criteria. For example, the multi-user authorization subsystem 234 may only consider approval messages from an authorization device 142 when the authorization device 142 is connected to the network 110 without using a network tunnel and where it has a network address that is within the range of network addresses of the managed network 100. The multi-user authorization subsystem 234 may also verify the credentials, authentication method, encryption, message signature, and/or certificate provided along with the message to determine whether the approval message is authentic and is from a user that is authorized to send approval/disapproval messages. In one embodiment, any deviation from the normal authentication process for a particular user of the multi-user authentication pool 140 may be reported to the other users in the pool for approval. If the requisite approval is not received, or a disapproval is received, the multi-user authorization subsystem 234 may remove or suspend the account of that particular user from being able to approve further changes, and/or instruct the rebuild manager 236 to rebuild the authorization device used by that particular user.

The multi-user authorization subsystem 234 determines if a requisite approval is provided for the change indicated in the change. This requisite approval may be a threshold number of the authorized users approving the change, a percentage of the total number of authorized users approving the change, and/or a particular subset of users of the authorized users (e.g., a team lead, manager, customer) approving the change. If the requisite approval is received, the multi-user authorization subsystem 234 may log the approval and transmit a message to the management library 126 to allow the change to continue/proceed. If the change is approved, the multi-user authorization subsystem 234 logs the approval and can additionally modify the exception list for the managed device 120 to include the change in the exception list for the managed device 120. This may include modifying the exception list accessed by the change detector 232 at the management system 130 or the exception list at the management library 126 to include rules that match the change that was approved. For example, if the change included a particular set of network traffic, the multi-user authorization subsystem 234 may modify the exception list to indicate that network traffic having the type, header information, source, destination, and other characteristics matching that of the network traffic that was detected should be allowed as approved change. As another example, if the change included an access to a particular area of data (e.g., a particular database), then the multi-user authorization subsystem 234 may modify the exception list to include a rule to allow access by executables on the managed device 120 to that data.

Conversely, if the multi-user authorization subsystem 234 does not receive the requisite approvals within a set time period (e.g., 1 minute), then the multi-user authorization subsystem 234 may determine that the change is not approved and logs the disapproval. The multi-user authorization subsystem 234 may also determine that the change is disapproved if it receives a requisite number of disapprovals. For example, a threshold number of users, or a percentage of users, and/or a special group of users may transmit disapproval messages to the multi-user authorization subsystem 234. In such a case, the multi-user authorization subsystem 234 may log the disapproval result and may indicate to the rebuild manager 236 that a rebuild of the managed device 120 is requested in order to repair the managed device 120 to prevent the change from occurring again.

The rebuild manager 236 restores the state of the managed device 120 to an earlier known good state in the event where an change is detected at the managed device 120 and where a requisite set of approvals is not received from the users of the multi-user authorization pool 140 for the change. The rebuild manager 236 may store a copy of the operating system 122, including its executables 124 and data 125, of the managed device 120 as a device image in the device images store 238. The device image may not only include data related to the operating system 122 that is stored on non-volatile memory, but also data related to the operating system 122 that is in volatile memory, e.g., the state of the random access memory assigned to the operating system 122. Each device image may be a 1:1 copy of the binary data comprising the operating system 122, executables 124, and data 125 of the managed device 120. The rebuild manager 236 may receive the data for the device image from the management library 126 of the managed device 120 after the managed device is switched to the release state. Therefore, each time the managed device 120 is placed in a state for normal operations, a copy of the software and data for the managed device 120 may be stored as a device image by the rebuild manager 236 at the device images store 238. The rebuild manager 236 may also generate a signature of the device image and mark that it is a device image of the managed device 120 in a known good state. Alternatively, device images may be marked as being in a known good state via a requisite approval from users of the multi-user authorization pool 140.

The rebuild manager 236 may also store a copy of a device image each time a reported change receives the requisite approvals from the multi-user authorization pool 140. These images may also be signed and marked. The rebuild manager 236 may also periodically record a device image of the managed device 120 to record regular changes that occur at the managed device 120. Although the device images are shown to be stored at the management system 130, in other embodiments the device images may be stored at the management library 126 to avoid unnecessary network usage from transferring of large amounts of data representing the device image.

When a change is detected by the change detector 232 which the multi-user authorization subsystem 234 determines is not approved by the users of the multi-user authorization pool 140, the rebuild manager 236 may initiate a rollback of the managed device 120 to an earlier state using a device image recorded for that managed device 120. The earlier state and the device image for that state records a state of the managed device 120 before the change was detected. Therefore, by using this earlier state device image on the managed device 120, the change is reverted and the managed device 120 is restored to a known good state. The rebuild manager 236 sends instructions to the rebuild layer 226 of the management library 126 to initiate the rollback by terminating all processes at the managed device 120, and then by replacing the currently stored data associated with the operating system, executables, and data with the data from the earlier state device image. The rebuild manager 236 may instruct the rebuild layer 226 to identify the electronic storage on which the current data is stored, and to replace the data on that electronic storage with the data from the device image. The rebuild manager 236 may also restore the volatile storage of the managed device 120 to a state as stored in the device image. Subsequently, the rebuild manager 236 may instruct the rebuild layer 226 to boot up or start the operating system 122 of the managed device to resume operations. The rebuild manager 236 may also instruct the management library 126 to cause the managed device 120 to enter a release state. Subsequently, the rebuild manager 236 may indicate in a log that the rollback is completed in response to the change that was detected. The rebuild manager 236 may log the entire rollback process.

In some cases, the rollback is not successful. This may be due to some error in the process or when the managed device 120 is compromised. If this occurs, the rebuild manager 236 may send a message to the device mode initializer 230 to cause the managed device 120 to enter the maintenance state. In this state, normal communications with the affected managed device 120 is terminated. The rebuild manager 236 may also send a message to an administrator or one or more users of the multi-user authorization pool 140 indicating that a rollback failed and that the managed device 120 is in a maintenance state.

In one embodiment, the management system 130 also includes a rolling replacement manager 240 to periodically replace the current operating system 122, executables 124, and data 125 of the managed device 120 with a device image, which may be stored in the device images store 238 or at the management library 126. The device image may be updated periodically to change passwords, encryption keys, add patches, and so on, such that the device image includes software that is up to date and less likely to be compromised using previously utilized attack vectors. Similar to the method performed by the rebuild manager 236, the rolling replacement manager 240 instructs the rebuild layer 226 of the managed device 120 to replace the current software and data on the managed device 120 with the data and software from the selected device image. By regularly replacing the data of the managed device 120, a malicious user is unable to gain a foothold in the system, as the system is frequently wiped clean and refreshed with a known good copy which does not include any modifications made by the attacker and which could be used to enter the system and cause any undesired change.

Turning now to the managed device 120, the management library 126 on the managed device 120 may be separate from the operating system 122 of the managed device 120 in order to be able to rollback and/or rebuild the operating system 122 (along with the executables 124 and data 125). The management library 126 may exist as a hypervisor, virtual machine manager, separate OS, firmware, etc. The management library 126 can also be rebuilt in the event that an change is detected. This may be achieved by having the management system 130 remotely access a low level firmware or other configuration utility of the managed device (e.g., a UEFI BIOS) to remove a current copy of the management library 126 software and to install a known good or updated version. Once installed, the management library 126 includes various elements to facilitate the monitoring of the managed device 120. As shown, the management library 126 includes the device mode configurator 220, configuration settings 222, detector 224, and the rebuild layer 226.

The device mode configurator 220 on the management library 26 configures the managed device 120 based on the state indicated from the management system 130 for the managed device 120. As noted above, these may be a release state, provisioning state, and maintenance state. In the release state, the device mode configurator 220 configures the detector 224 to detect all changes in the operating system 122 and to report any changes to the management system 130. In the provisioning state, the device mode configurator 220 configures the detector 224 to detect all changes as well, but not to report any changes immediately. Instead, the device mode configurator 220 configures the detector 224 to report any changes that have occurred once the managed device is transitioned into the release state. Finally, in the maintenance state, the device mode configurator 220 configures the detector 224 to not detect any changes. For each state, the device mode configurator 220 may configure the operation of the detector 224 by storing settings for the detector 224 in the configuration settings 222.

The detector 224 monitors changes in the managed device 120 and reports any changes to the change detector 232 of the management system 130. To achieve this, the detector 224 may execute as a separate process outside the operating system (e.g., as a hypervisor, within firmware, etc.) or may execute as one or more executables (e.g., executables 124) within the operating system. The detector 224 has access to monitor all changes performed on the operating system 122.

A change on the operating system 122 may generally refer to any access, by a user account, to a resource provided by the operating system 122. This access may differ from any previous behavior in the operating system 122. The access may include read, write, transmission, receipt, execution, modification of permissions, changing of settings, and so on. A resource provided by the operating system includes any physical resource of the managed device 120 that the operating system 122 can expose, such as network resources, memory resources, input/output resources (e.g., keyboard, mouse, printer, display), processor resources (e.g., CPU, GPU, special purpose processors), storage resources, as well as any logical services provided by the operating system, such as services, libraries, application programming interfaces, drivers, hardware interfaces, and so on. The user account is a construct within the operating system, as described above with reference to the operating system 122 in FIG. 1, that permits a user with credentials to access the user account certain permissions within the operating system 122 to perform certain types of access against certain resources provided by the operating system 122. Although typically a user access a user account, in some cases the operating system itself may utilize a user account to perform various activities, such as upgrades or patches. Such a user account may be called a system account. A change may also include an omission or rejection of any access by a user of a resource. Thus, for example, where an access has occurred previously (e.g., the transmission of a heartbeat signal), the omission of this access at a later time is a change. As another example, where a device previously allowed access via a particular network connection, and now does not respond or refuses access, is a change.

The detector 224 monitors every change occurring within the operating system 122 using various application programming interfaces, system calls, shell scripts, shell commands, libraries, low level I/O monitoring, low level network monitoring, or using other methods. For each change that is detected, the detector 224 may report this change to the change detector 232 of the management system 130. This in turn triggers the multi-user approval process previously described and may cause a rebuild of the operating system. The detector 224 may also log any detected changes and may also log change that is not determined to be an non-excluded change as well.

In one embodiment, the detector 224 may not report every detected change to the change detector 232. Instead, the detector compares the change to changes indicated in an exception list. This exception list may be similar to the exception list of the change detector 232, and may be stored in the configuration settings 222. The exception list indicates which changes, i.e., which types of access by which users against which resources, are exceptions that do not need to be reported to the change detector 232 and thus do not need approval by the multi-user authorization pool 140. To initially configure the exception list, the management system 130 or management library 126 may be requested to perform an analysis of all previously logged changes of the managed device 120 during normal operation. This may occur during a provisioning state. After this analysis, a report of the most common or most frequent changes encountered may be provided. From this report, certain changes may be automatically selected based on frequency of encounter, access type, user account used, or some other factors and indicated to be part of the exception list. Alternatively, an administrator(s), such as the multi-user authorization pool 140, may select those changes that should be included in the exception list. The exception list may also be generated in a similar fashion to the exception list described above for the management system 130.

In another embodiment, the detector 224 detects changes not only occurring at the operating system 122, but also at other components of the managed device 120 which are not the operating system 122, such as the firmware (BIOS, UEFI), and reports any changes to these elements as well (although they may also be associated with an exception list).

The rebuild layer 226 rebuilds the operating system 122 using a stored device image in response to an instruction from the management system 130. In response to either a request from the rebuild manager 236 or the rolling replacement manager 240, the rebuild layer 226 may replace the current operating system 122 with a device image of the operating system 122 that is of a known good state, as described above with reference to the rebuild manager 236 and the rolling replacement manager 240. The rebuild layer is not part of the operating system 122, but exists outside the operating system (e.g., as a hypervisor, a part of the firmware, etc.). This allows it to manipulate the operating system 122 without itself being erased or removed. A user accessing the operating system 122 cannot access the rebuild layer 226, even if that user has full user privileges, as the rebuild layer 226 exists in a layer outside of the operating system 122. The rebuild layer 226 can erase any data stored within electronic storage and memory associated with the managed device 120, and can halt any execution by a processor(s) of the managed device 120. The rebuild layer 226 can write to the same electronic storage and memory, and can cause the processor(s) of the managed device 120 to enter a bootup sequence or to load and execute a particular set of instructions from the electronic storage. This allows the rebuild layer 226 to halt current execution, remove/replace the current operating system 122 with data from a device image, and then cause the processor(s) of the managed device 120 to boot up the newly imaged operating system 122. The rebuild layer 226 may perform this operation in response to an instruction from the management system 130 to rebuild the system.

In one embodiment, instead of rebuilding the entire system by writing each block of the device image to the electronic storage, the rebuild layer 226 may determine a difference, or delta, between the current data stored in the electronic storage and the device image, and only write to the electronic storage those blocks of data that have changed from the device image such that they are reverted back to the data indicated in the device image. This may significantly reduce the time needed to roll back the operating system 122. In another embodiment, the rebuild layer 226 may prepare a separate physical or logical volume of electronic storage which contains a prior device image which may be specified by the management system 130. In response to a request from the management system 130 to roll back or rebuild the operating system 122, the rebuild layer 226 may disconnect the managed device 120 (either logically or via a physical connection) from the current electronic storage and connect the managed device 120 to the separate volume that includes the already written device image. This allows instantaneous switching of the managed device 120 to the device image of known good state. After the switch, the rebuild layer 226 may rewrite the device image on the now offline physical/logical volume with the same device image of known good state (or with another device image provided or indicated by the management system 130).

Exemplary Cluster

Figure 3:
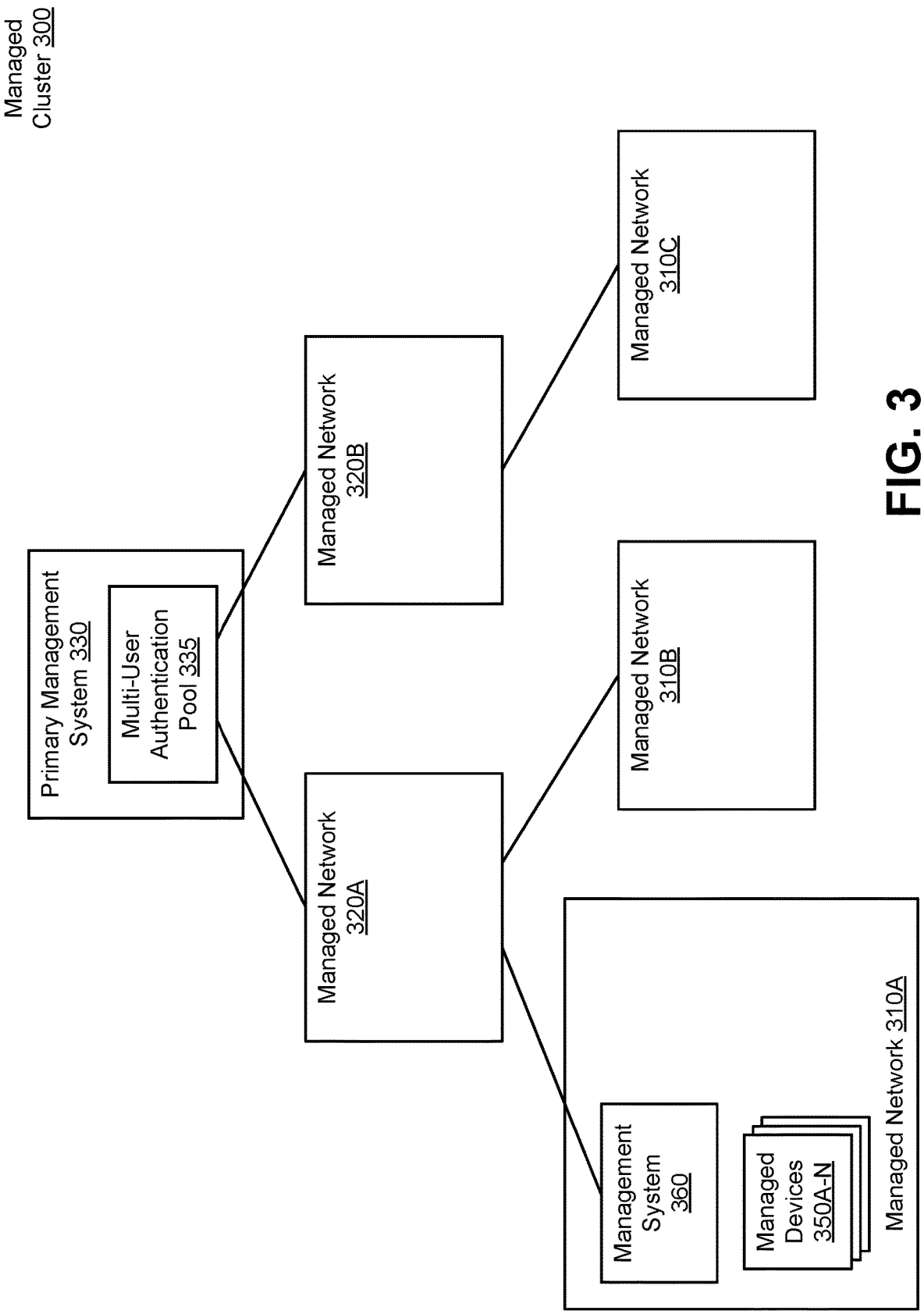
FIG. 3 is a block diagram illustrating a centrally managed cluster of managed networks 310, in accordance with an embodiment.

FIG. 3 is a block diagram illustrating a centrally managed cluster 300 of managed networks 310, in accordance with an embodiment. In some cases, the management of the managed network may not simply be confined to a single organization or local network of devices, but may be spread among multiple organizations, each with their own managed network. In order to manage all these individual networks together, a managed cluster 300 is organized as shown. Here, instead of each managed network 310 or 320 having its own set of multi-user authorization pools, any changes detected by a management system, e.g., management system 360 from changes of the managed devices, e.g., managed devices 350, in the managed network are instead reported to a managed network that is higher up in a hierarchy of managed networks. Thus, for example, managed network 310A reports any changes to a management system of managed network 320A. The other managed networks 310 report to at least one of the managed networks 320, which in turn reports to another managed network further up in the hierarchy. Ultimately, all changes are reported to a primary management system 330, which itself includes a multi-user authorization pool 335. The function of this pool is similar to the multi-user authorization pool 140, but instead of approving changes from activities on a single managed network, this pool may approve of changes across multiple ranks of managed networks. If the pool disapproves of a change, then the indication of the disapproval may be transmitted to each of the management systems of each of the managed networks to cause a rollback of any device that generated the change or remediation of any change that matches the disapproved change. On the other hand, if the change is approved, then this information is propagated to each of the managed networks in the managed cluster 300. If approved, the change may also be added to an exception list for the relevant managed device or managed network where the change was detected. All communications between the networks are secured, e.g., via encryption, rolling encryption, or other means, such that fraudulent messages are not accepted between the different networks.

Each managed network may also detect changes in any managed networks for which they are a parent. For example, similar to the change detector 323 and the managed device 120 of FIG. 2, each management system of each managed network may receive heartbeat signal from child networks, may probe child networks, may check connections to child networks, and so on, in order to detect any changes, such as rejection of a previously allowed connection, etc. If an change is detected in a child network which is not approved, the management system of the parent network may be able to cause a rollback of all components of the child network, including a rollback of the management system of the child network. This may be achieved similarly to the rollback of the operating system 122 of the managed device 120. For example, the management system of the parent network may have access to a low level firmware or utility that allows it to transmit a device image to the computing device executing the management system in the child network in order to replace the software of the management system with the software in the device image which has a known good state of the management system for that child network. Furthermore, the parent network may periodically make device images of the management system software of the child network, as well as periodically rebuild the management system software of the child network.

Because each managed network is tightly coupled within the hierarchy, with ultimate control only allowed by the "ultimate" primary management system 330, any attack on any component within the cluster 300 is easily detected and changes reverted using a rollback process. Furthermore, as only the users of the primary management system 330 can approve changes, any users with root or privileged access to any devices or systems within the various child networks will not be able to cause any permanent changes, as these changes are quickly reverted. If the primary system is compromised or taken offline, this also does not affect the cluster 300 as this simply means that no new changes are approved, but that the existing activity can continue to be allowed, allowing the entire cluster 300 to continue to operate.

Example Compliance Monitor

Figure 4:
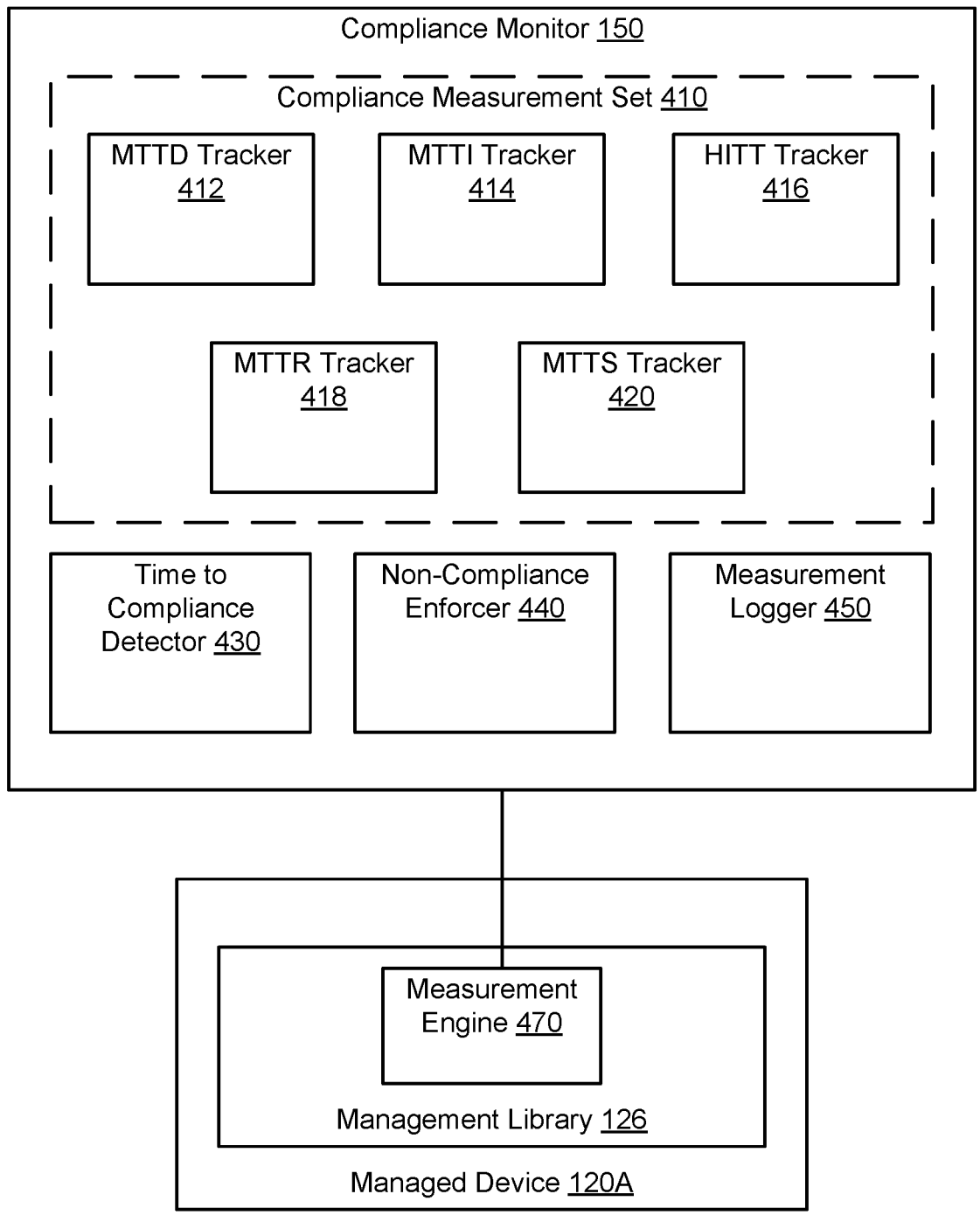
FIG. 4 is a block diagram that illustrates the compliance monitor of FIG. 1 in further detail, in accordance with an embodiment.

FIG. 4 is a block diagram that illustrates the compliance monitor 150 of FIG. 1 in further detail, in accordance with an embodiment. The compliance monitor 150 may be used, as described above, to determine whether the managed network 100 is in compliance with a previously agreed upon SLA, or service level agreement. In one embodiment, the compliance monitor 150 includes a compliance measurement set 410 including multiple trackers 412-420, as well as a time to compliance detector 430, non-compliance enforcer 440, and measurement logger 450. The compliance monitor 150 may be connected to a measurement engine 470 at the management library 126 of the managed device 120 to facilitate the measurement of the various SLA metrics by the trackers of the compliance measurement set 440.

The compliance measurement set 410 includes multiple trackers which track various metrics of the managed network 110. These metrics may be used to determine if the SLA is being met (i.e., enforced). In one embodiment, the compliance measurement set 410 includes a MTTD (mean time to detection) tracker 412, a MTTI (mean time to isolation) tracker 414, an HITT (hacker investigation tracking time) tracker 416, a MTTR (mean time to repair) tracker 418, and a MTTS (mean time to service) tracker 420. The metric generated by each tracker is subsequently sent to the time to compliance detector 430, non-compliance enforcer 440, and measurement logger 450 for further processing. Although a particular arrangement of trackers is shown here, in other embodiments the compliance measurement set 410 may include a greater or fewer number of trackers based on the type of metrics which the SLA is intended to enforce.

The MTTD tracker 412 tracks the mean time taken by the managed network 100 between an attack from a malicious user to the detection of the attack, i.e., the time it takes to detect a change after that change occurs in the managed network 100. These may only be changes which were not listed in an exception list. In order to determine this mean time, the MTTD tracker 412 may identify the occurrence of each change that is detected by the management system 130 and which was not given the requisite approval by the multi-user authorization pool 140. For each of these events, the MTTD tracker 412 may further determine the specific change which occurred that was determined to be unapproved by accessing logs generated by the management system 130 and determine from the logged information when the change first occurred. For example, if the change is an access to some resource within the operating system 122, the MTTD tracker 412 may determine when that access first occurred according to timestamps associated with any commands issued during the change, or timestamps associated with the resource that was accessed. The MTTD tracker 412 may find timestamps associated with issued commands in various system logs (e.g., a system call log). The MTTD tracker 412 may find timestamps associated with resources that are accessed in logs associated with the resource that was accessed, or based on a last accessed timestamp for that resource. For example, a network resource may include a log indicating network data that is sent/received and the timestamp of the transmissions. As another example, a file resource may include a filesystem timestamp indicating a last accessed timestamp. The MTTD tracker 412 computes for each of these incidents a difference in time between when the change detector 232 detected the event and reported it to the multi-user authorization pool 140, and the timestamp associated with when the access first occurred for that change. This difference is the time to detection for this particular event. The MTTD tracker 412 may then determine a mean, rolling average (e.g., 5 hour rolling average), probability distribution, or other statistical analysis of the time to detection values for all detected change events. This is the mean time to detection (MTTD) metric. Alternatively, a mean time to detection may be computed for each individual managed device 120. In such a case the mean time to detection for an individual managed device only includes an average of the time to detection for changes detected for that managed device 120. A mean time to detection below a threshold (e.g., a threshold indicated in the SLA) may indicate that the managed network 100 is quickly detecting threats, which is desirable. Conversely, a longer mean time to detection may indicate that the managed network 100 is not properly detecting changes and improvements may be needed to speed up the detection.

The MTTI tracker 414 tracks a mean time to isolation for the managed network 100. The mean time to isolation measures an average time taken between the detection of an change and the isolation or remediation of that change in the managed network 100. This may only apply to changes which were not indicated in an exception list. To measure this value, the MTTI tracker 414 may identify instances where the change detector 232 has detected an non-excluded change and where the change did not receive the requisite approval by the users of the multi-user authorization pool 140. The MTTI tracker 414 may access logs generated by the change detector 232 to determine the timestamp at which the detection/identification of the change occurred. This may be the time at which the change detector 232 first identifies the change, before approval is submitted to the multi-user authorization pool 140. The MTTI tracker 414 further tracks the timestamp of when a remediation of the change occurs. In this case, the remediation may be a rollback of the managed device 120 at which the change was detected. The MTTI tracker 414 may access the logs generated by the rebuild manager 236 to determine when the rollback is completed (or when the operating system 122 of the managed device 120 is halted). The difference between the timestamp of the detection and the timestamp of when the rollback is completed may be the time to isolation. The MTTI tracker 414 further determines a mean, rolling average (e.g., 5 hour rolling average), probability distribution, or other statistical analysis of the computed differences for each instance of detected change to determine the metric of mean time to isolation. Alternatively, the mean time to isolation may be computed for time to isolation events for each individual managed device 120. This mean time to isolation may indicate how quickly the managed network 100 responds to a detected threat. A shorter mean time to isolation below a threshold (e.g., a threshold dictated in the SLA) may indicate that the response time of the managed network 100 is good. A longer mean time may indicate that the managed network 100 is taking too long to respond to threats and investigation is needed.

The HITT tracker 416 tracks a hacker investigation tracking time. This is a tracker that tracks the time a malicious user remains within the managed network 100 or within a single managed device 120. To track this information, the HITT tracker 416 may determine, similar to the MTTD tracker 412, a timestamp for a first instance of a disapproved change occurring at the managed network 100 or managed device 120. The HITT tracker 416 further determines a user account associated with this change. The HITT tracker 416 determines, for that user account, whether it causes any additional disapproved changes. The HITT tracker 416 determines the last disapproved change caused by that user account. No further disapproved changes may occur either because the malicious user ceased their attack or because remediation occurred and the access was blocked (e.g., via a rollback). The HITT tracker 416 then determines a difference in time between the first disapproved change and the last disapproved change. This is the hacker investigation tracking time metric and indicates how long a malicious user remains at the managed network 100 or within a managed device 120. The HITT tracker 416 may operate in conjunction with a honeypot system. A honeypot is an element on the managed network 100, such as computing device, virtual machine, etc., that acts as a legitimate target for attack, but is in actuality a dummy target with resources that do not contain any actual valuable information. Such a honeypot is used to lure attackers. Thus, the hacker time to investigate metric may record how long a malicious user spends in accessing the honeypot resource.

This hacker time to investigate metric may be used to determine how long malicious attackers stay at the managed network 100. A longer time value may be undesirable as this may indicate that the managed network 100 has multiple potential exploitable vulnerabilities which an attacker attempts to explore.

The MTTR tracker 418 tracks a mean time to repair for a managed device 120. The repair of the managed device 120 refers to a remediation of the managed device due to change detected at the device which did not receive the requisite approval. Once repaired, the malicious attacker is "kicked out" of the managed network 100. This repair process may include, for example, rollback of the device as described above. It may also include the execution of one or more repair tools at the managed device to revert any undesirable changes made due to the change. The MTTR tracker 418 may track this time to repair by accessing logs generated by the rebuild manager 236 for rebuilds of the managed device 120. These logs may include information regarding when a rollback was started, and when the rollback was completed, i.e., when operating system 122 was halted, and when the operating system 122 was booted up after the known good device image was written to the electronic storage of the managed device 120 to replace the previous operating system 122 and related data. The MTTR tracker 418 determines a time to repair for the managed device 120 by determining a difference between when the rollback was completed and when the rollback was initiated. The MTTR tracker 418 may further determine a mean, rolling average (e.g., 5 hour rolling average), probability distribution, or other statistical analysis of this time to repair for each managed device that is repaired/rolled back in order to determine the mean time to repair metric. Alternatively, the MTTR tracker 418 may determine the mean time to repair for all managed devices 120 on the managed network 100.

The MTTS tracker 420 tracks a mean time to recovery of a service provided by the managed network 100 to customers/clients of the organization responsible or having ownership of the managed network 100. The MTTS tracker 420 may track an overall time that a service provided by a managed device 120 is unavailable due to the detection of a change at the managed device 120 and the repair of that device. Thus, this time may include a time period from the time of detection, until the time that the repair, e.g., a rollback, is completed and the managed device 120 is once again available to provide the service. The MTTS tracker 420 may compute this time by accessing logs generated by the change detector 232 and the rebuild manager 236 to determine a difference between a timestamp at which the rollback of a managed device is completed, and when the change detector 232 first detected the change that caused the eventual rollback. The MTTS tracker 420, like the other trackers, may determine a mean or other statistical analysis of the various times to service recovery for all recorded service outages to generate the mean time to service metric for a particular service.

Although not shown here, the compliance measurement set 410 may include additional trackers to track other metrics related to a service level agreement. These metrics may be related to tracking the initialization and termination of certain processes (i.e., executables) executing on a managed device, user account login and logoff sessions, various file system accesses, network accesses, certain log entries, uptime checking, integrity checking, and so on. If an SLA necessitates a particular metric to be measured, a tracker may be initialized as part of the compliance measurement set 410 to track this metric.

The time to compliance detector 430 detects a time to compliance for the overall managed network 100. The time to compliance detector 430 determines the period of time between when a managed network 100 falls out of compliance with the SLA, to when the managed network 100 comes back into compliance with the SLA. As noted, the SLA requires that various metrics of the managed network 100 should be within some threshold bounds. For example, a mean time to detection may be required to be under 30 seconds. The time to compliance detector 430 may use the metrics measured by the trackers of the compliance measurement set 410 to determine when any of the tracked metrics exceed an agreed upon threshold indicated in the SLA, and to further determine an amount of time until the same tracker reports a metric value that is now within the threshold required by the SLA. This difference in time may be determined by the time to compliance detector 430 as the time to compliance. The time to compliance detector 430 may determine a mean, rolling average, probability distribution, or other statistical analysis of the different time to compliances that are computed for each instance where a metric exceeds a threshold required in the SLA in order to further determine a mean time to compliance for the managed network.

The non-compliance enforcer 440 performs various actions in response to any of the trackers of the compliance measurement set 410 or the time to compliance detector indicating a value that exceeds a threshold value required by the SLA or exceeds some other predetermined threshold value. The non-compliance enforcer 440 may select an action that depends upon the particular tracked metric that has exceeded the SLA-defined threshold. In the case of certain metrics, the non-compliance enforcer 440 may initiate a rollback/rebuild of the managed devices 120 which have metrics exceeding the threshold, when a threshold number of tracked metrics each exceed their SLA-defined thresholds, if a metric exceeds a threshold a multiple number of times over a time period, or if a metric exceeds a threshold for at least a minimum period of time. For example, if a mean time to repair metric of a managed device exceeds a threshold, this may indicate that a rollback of the device is not occurring quickly enough, and so in response the non-compliance enforcer 440 may request the management system 130 to initiate a rollback of this managed device 120. As another example, if the time to compliance detector indicates that the time to compliance has exceeded the SLA-defined threshold for over a day, this may indicate a significant issue within the managed network 100, such as a denial of service attack or other issue. In response, the non-compliance enforcer 440 may cause a rollback of all devices in the entire managed network 100.

In other embodiments, depending on the metric that exceeds the threshold, the non-compliance enforcer 440 may perform other remedial actions. For example, the non-compliance enforcer 440 may cause a session for which change is detected, and for which a metric related to that session exceeds a threshold, to perform various security actions on the session, such as deep packet inspection, malformed packet detection, blocking session activity, and so on. The non-compliance enforcer 440 may escalate and add additional security actions as the metrics for that session continue to further exceed the threshold. In one embodiment, the non-compliance enforcer 440 may only respond to those changes which are not in an exception list.

In some embodiments, instead of comparing the metrics against SLA-derived thresholds, the non-compliance enforcer 440 may use machine learning or other statistical analysis methods to determine the threshold values. The non-compliance enforcer 440 may access historical metric values and determine based on this information a threshold value for each metric. For example, the non-compliance enforcer 440 may set a threshold for a metric to 150% of a 5 day rolling average of the metric's historical values.

Prior to performing any action, the non-compliance enforcer 440 may also transmit a message to the multi-user authorization pool 140 for approval of the action, similar to the process performed by the change detector 232 as described with reference to FIG. 2 when approving or disapproving a detected change.

The measurement logger 450 logs the metrics tracked by the trackers of the compliance measurement set 410, e.g., trackers 412-420, and by the time to compliance detector 430. The measurement logger 450 may log this information over time. The measurement logger 450 may also log any remedial actions, such as rollbacks, security actions, and so on, which may have been performed against any of the managed devices 120 of the managed network. Upon request, the measurement logger 450 may also generate a report of these tracked metrics for the managed network 100 over time. Using this information, an administrator or other entity can determine the current and historical compliance rate, compliance level, and adherence to the SLA for the managed network. This also allows the entity to quickly determine whether the system is out of compliance and whether it needs any remedial action. With this advanced insight into the system, an organization can quickly determine if any issues have occurred on the network. This is advantageous and is in contrast with current systems, whereby an organization may only realize much later that their systems had been compromised, allowing an attacker to cause additional damage during this latent period where the attack was not yet detected. Subsequently this causes the organization to issue a letter or message to all affected users of their service indicating the oftentimes significant data breach or other issue. However, with the ability to quickly track these metrics and see the automated rollbacks that occur when the metrics exceed a threshold, the organization no longer has to face such a negative scenario.

Example Flows

Figure 5:
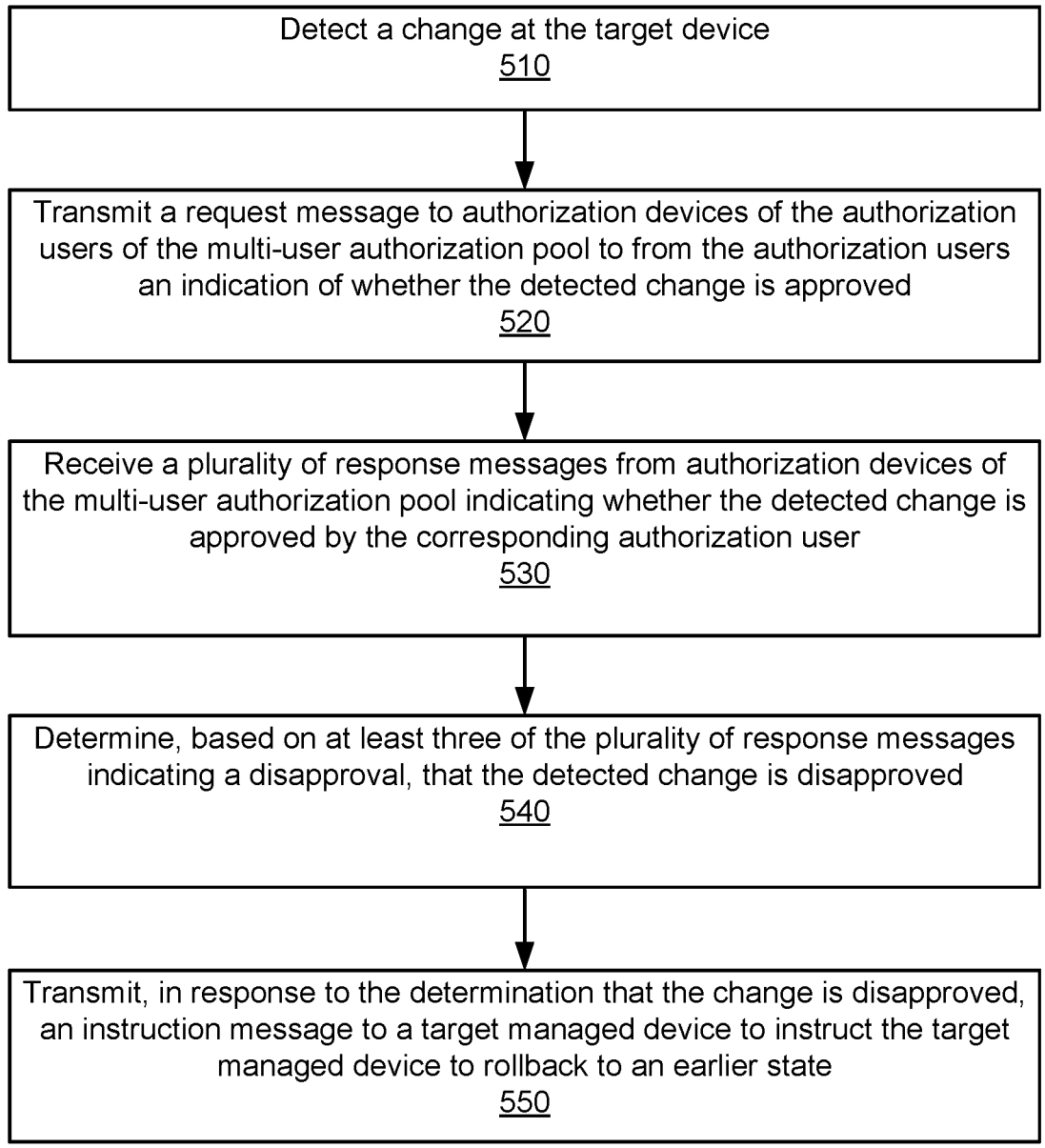
FIG. 5 is a flow diagram illustrating a process for monitoring and preventing root level attacks, in accordance with an embodiment.

FIG. 5 is a flow diagram illustrating a process for monitoring and preventing root level attacks, in accordance with an embodiment. In one embodiment, the operations described in the flow diagram are performed by the management system 130. Although a certain set of operations is described herein, in other embodiments the arrangement and number of operations vary.

The management system 130 detects 510 a change at the target device. This may be achieved via the change detector 232 as described above with reference to FIG. 2.

The management system 130 transmits 520 a request message to authorization devices of the authorization users of the multi-user authorization pool to from the authorization users an indication of whether the detected change is approved. This allows the management system 130 to determine whether that change should be allowed to continue or if some remedial action is needed.

The management system 130 receives 530 a plurality of response messages from authorization devices of the multi-user authorization pool indicating whether the detected change is approved by the corresponding authorization user. The management system 130 determines 540, based on at least three of the plurality of response messages indicating a disapproval, that the detected change is disapproved. By soliciting approval/disapproval messages from at least three users at once, the system can avoid a single point of failure where a single user's system is compromised.

The management system 130 transmits 540, in response to the determination that the change is disapproved, an instruction message to a target managed device to instruct the target managed device to rollback to an earlier state.

Figure 6:
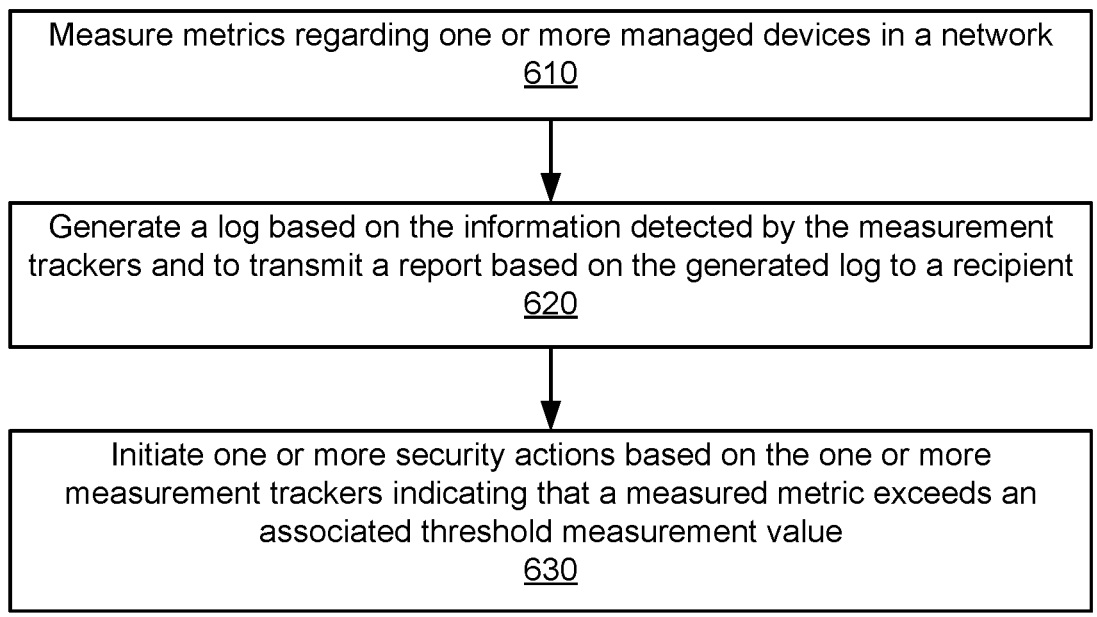
FIG. 6 is a flow diagram illustrating a process for measuring compliance on a set of managed devices, in accordance with an embodiment.

FIG. 6 is a flow diagram illustrating a process for measuring compliance on a set of managed devices, in accordance with an embodiment. In one embodiment, the operations described in the flow diagram are performed by the compliance monitor 150. Although a certain set of operations is described herein, in other embodiments the arrangement and number of operations vary.

The compliance monitor 150 measures 610 metrics regarding one or more managed devices in a network. These may be measured by any one of the trackers described above with reference to FIG. 4. The compliance monitor generates a log based on the information detected by the measurement trackers and to transmit a report based on the generated log to a recipient. This may be performed, for example, by the measurement logger 450 described above. The compliance monitor 150 also initiates 630 one or more security actions based on the one or more measurement trackers indicating that a measured metric exceeds an associated threshold measurement value. These security actions may be performed by the non-compliance enforcer 440 as described above.

Computing Machine Architecture

Figure 7:
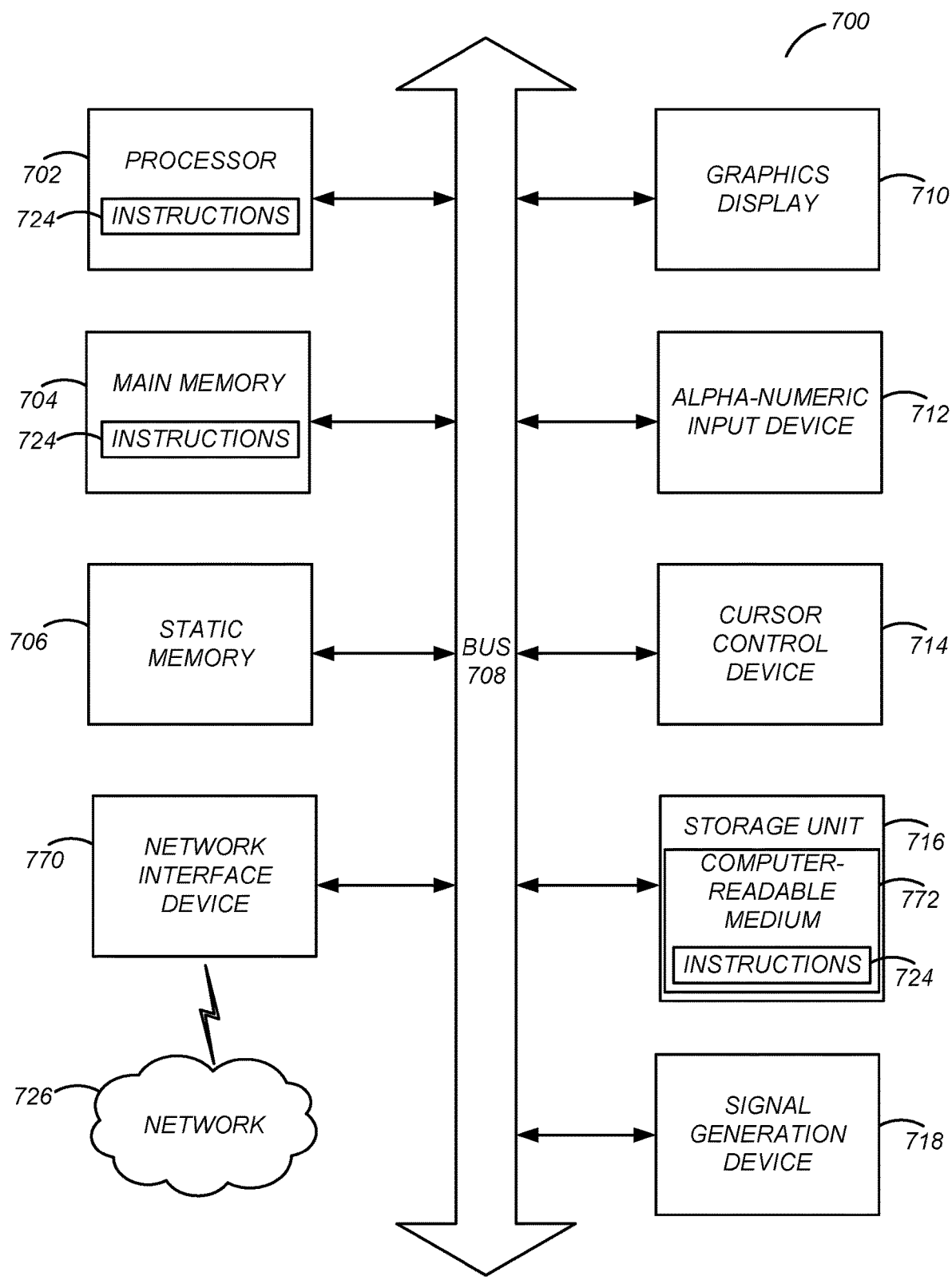
FIG. 7 is a block diagram illustrating an example computing device, in accordance with an embodiment.

FIG. 7 is a block diagram illustrating components of an example computing machine that is capable of reading instructions from a computer-readable medium and execute them in a processor (or controller). A computer described herein may include a single computing machine shown in FIG. 7, a virtual machine, a distributed computing system that includes multiples nodes of computing machines shown in FIG. 7, or any other suitable arrangement of computing devices. The computer described herein may be used by any of the elements described in the previous figures to execute the described functions.

By way of example, FIG. 7 shows a diagrammatic representation of a computing machine in the example form of a computer system 700 within which instructions 724 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 7 may correspond to any software, hardware, or combined components shown in the figures above. While FIG. 7 shows various hardware and software elements, each of the components described in the figures above may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 724 that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processors (generally, processor 702) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a computer-readable medium 722 on which is stored instructions 724 embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting computer-readable media. The instructions 724 may be transmitted or received over a network 726 via the network interface device 720.

While computer-readable medium 722 is shown in an example embodiment to be a single medium, the term "computer-readable medium" should be taken to include a single medium or multiple media (e.g., a centralized or distributed database, or associated caches and servers) able to store instructions (e.g., instructions 724). The computer-readable medium may include any medium that is capable of storing instructions (e.g., instructions 724) for execution by the machine and that cause the machine to perform any one or more of the methodologies disclosed herein. The computer-readable medium may include, but not be limited to, data repositories in the form of solid-state memories, optical media, and magnetic media. The computer-readable medium does not include a transitory medium such as a signal or a carrier wave.

Additional Considerations

Certain embodiments are described herein as including logic or a number of components, engines, modules, or mechanisms, for example, as illustrated in the above figures. Engines may constitute either software modules (e.g., code embodied on a computer-readable medium) or hardware modules. A hardware engine is a tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or another programmable processor) that is temporarily configured by software to perform certain operations. It will be appreciated that the decision to implement a hardware engine mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented engines that operate to perform one or more operations or functions. The engines referred to herein may, in some example embodiments, comprise processor-implemented engines.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a similar system or process through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

What is claimed is:

1. A method comprising
receiving, from a plurality of devices in a managed network, logged information describing activity of the plurality of devices in the managed network;
computing a first set of values for a set of security compliance metrics for the managed network based on the received logged information;
comparing, at a first time, each of the first set of values for the set of security compliance metrics to a threshold value corresponding to each value;
identifying a security compliance metric of the set of security compliance metrics that is out of compliance with a service level agreement based on the comparing;
receiving additional logged information from the plurality of devices;
computing, at a second time later than the first time, a second set of values for the set of security compliance metrics based on the additional logged information;
comparing each of the second set of values for the set of security compliance metrics to the threshold value corresponding to each value;
determining that the identified security compliance metric that is in compliance with the service level agreement based on the comparing of the second set of values;
computing a time to compliance for the managed network based on the first time, the second time, the logged information, and the additional logged information;
comparing the time to compliance to a threshold value; and
initiating, responsive to the time to compliance exceeding the threshold value, a security action.

2. The method of claim 1, wherein the security action includes rolling back a state of a managed device to an earlier known good state when a measured metric for that managed device exceeds the associated threshold measurement value.

3. The method of claim 1, wherein the set of security compliance metrics includes a mean time to isolation metric representing a mean time to an isolation of each device of the plurality of devices when a change is detected at the device.

4. The method of claim 1, wherein the set of security compliance metrics includes a hacker investigation time metric that tracks a time spent by a malicious attacker at a device of the plurality of devices.

5. The method of claim 4, wherein the device is a honeypot designed to provide dummy resources for a malicious attacker to access, the dummy resources being attractive to the malicious attacker.

6. The method of claim 1, wherein the set of security compliance metrics includes a mean time to repair metric that represents a mean time to repair a device of the plurality of devices after a change is detected at the device.

7. The method of claim 1, wherein the set of security compliance metrics includes a mean time to service metric that represents a mean time to restore a service provided by the plurality of devices in the network after a disruption of the service caused by a change detected at a device of the plurality of devices.

8. The method of claim 1, further comprising:
selecting a security action of a plurality actions based on the identified security compliance metric; and
initiating, responsive to the time to compliance exceeding the threshold value, the selected security action.

9. The method of claim 1, wherein computing the first set of values for the set of security compliance metrics comprises:
computing each value of the set of the first set of values by a tracker corresponding to each security compliance metric of the set of security compliance metrics.

10. The method of claim 1, further comprising:
transmitting a notification of the initiated security action to a user.

11. A non-transitory computer-readable medium storing instructions that, when executed by a processor, cause the processor to perform operations comprising:
receiving, from a plurality of devices in a managed network, logged information describing activity of the plurality of devices in the managed network;
computing a first set of values for a set of security compliance metrics for the managed network based on the received logged information;
comparing, at a first time, each of the first set of values for the set of security compliance metrics to a threshold value corresponding to each value;
identifying a security compliance metric of the set of security compliance metrics that is out of compliance with a service level agreement based on the comparing;
receiving additional logged information from the plurality of devices;
computing, at a second time later than the first time, a second set of values for the set of security compliance metrics based on the additional logged information;
comparing each of the second set of values for the set of security compliance metrics to the threshold value corresponding to each value;
determining that the identified security compliance metric that is in compliance with the service level agreement based on the comparing of the second set of values;
computing a time to compliance for the managed network based on the first time, the second time, the logged information, and the additional logged information;
comparing the time to compliance to a threshold value; and
initiating, responsive to the time to compliance exceeding the threshold value, a security action.

12. The computer-readable medium of claim 11, wherein the security action includes rolling back a state of a managed device to an earlier known good state when a measured metric for that managed device exceeds the associated threshold measurement value.

13. The computer-readable medium of claim 11, wherein the set of security compliance metrics includes a mean time to isolation metric representing a mean time to an isolation of each device of the plurality of devices when a change is detected at the device.

14. The computer-readable medium of claim 11, wherein the set of security compliance metrics includes a hacker investigation time metric that tracks a time spent by a malicious attacker at a device of the plurality of devices.

15. The computer-readable medium of claim 14, wherein the device is a honeypot designed to provide dummy resources for a malicious attacker to access, the dummy resources being attractive to the malicious attacker.

16. The computer-readable medium of claim 11, wherein the set of security compliance metrics includes a mean time to repair metric that represents a mean time to repair a device of the plurality of devices after a change is detected at the device.

17. The computer-readable medium of claim 11, wherein the set of security compliance metrics includes a mean time to service metric that represents a mean time to restore a service provided by the plurality of devices in the network after a disruption of the service caused by a change detected at a device of the plurality of devices.

18. The computer-readable medium of claim 11, further storing instructions that, when executed by a processor, cause the processor to perform operations comprising:
   selecting a security action of a plurality actions based on the identified security compliance metric; and
   initiating, responsive to the time to compliance exceeding the threshold value, the selected security action.

19. The computer-readable medium of claim 11, wherein computing the first set of values for the set of security compliance metrics comprises:
   computing each value of the set of the first set of values by a tracker corresponding to each security compliance metric of the set of security compliance metrics.

20. The computer-readable medium of claim 11, further storing instructions that, when executed by a processor, cause the processor to perform operations comprising:
   transmitting a notification of the initiated security action to a user.

* * * * *